United States Patent
Inoue

(10) Patent No.: US 10,174,834 B2
(45) Date of Patent: Jan. 8, 2019

(54) CONTROL APPARATUS FOR VEHICULAR CONTINUOUSLY VARIABLE TRANSMISSION

(71) Applicant: TOYOTA JIDOSHA KABUSHIKI KAISHA, Toyota-shi, Aichi-ken (JP)

(72) Inventor: Daisuke Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 15/441,407

(22) Filed: Feb. 24, 2017

(65) Prior Publication Data
US 2017/0254412 A1    Sep. 7, 2017

(30) Foreign Application Priority Data

Mar. 3, 2016   (JP) ................................ 2016-041549

(51) Int. Cl.
| F16H 61/12 | (2010.01) |
| F16H 9/18 | (2006.01) |
| F16H 61/662 | (2006.01) |
| F16H 9/26 | (2006.01) |

(52) U.S. Cl.
CPC ............. *F16H 61/12* (2013.01); *F16H 9/18* (2013.01); *F16H 9/26* (2013.01); *F16H 61/662* (2013.01); *F16H 2061/1252* (2013.01); *F16H 2061/1264* (2013.01); *F16H 2061/1268* (2013.01)

(58) Field of Classification Search
None
See application file for complete search history.

(56) References Cited

U.S. PATENT DOCUMENTS

| 9,689,491 | B2 * | 6/2017 | Ito ........................... F16H 61/12 |
| 2010/0255941 | A1 | 10/2010 | Ogata et al. |
| 2011/0087397 | A1 * | 4/2011 | Iraha ....................... F16H 61/12 |
| | | | 701/31.4 |
| 2011/0313632 | A1 * | 12/2011 | Yoshimizu ............. F16H 61/12 |
| | | | 701/60 |
| 2014/0025269 | A1 * | 1/2014 | Ayabe ..................... F16H 61/12 |
| | | | 701/60 |
| 2017/0016530 | A1 | 1/2017 | Moriyama et al. |

FOREIGN PATENT DOCUMENTS

| CN | 101910684 A | 12/2010 |
| JP | 2013-160379 A | 8/2013 |
| JP | 2017-025953 A | 2/2017 |

* cited by examiner

*Primary Examiner* — Justin Holmes
(74) *Attorney, Agent, or Firm* — Oliff PLC

(57) ABSTRACT

A control apparatus for a vehicular continuously variable transmission is provided. The control apparatus includes a pair of pulley pressure adjusting valves, a pair of electromagnetic valves, a source pressure adjusting valve and an electronic control unit. The electronic control unit is configured to control the source pressure adjusting valve in such a manner as to lower the source pressure at a time of a fail mode below the source pressure at a time of a non-fail mode, at the time of the fail mode, and control command signals to the pair of the electromagnetic valves such that the command signals temporarily decrease below command signals at the time of the non-fail mode, before cancelling the lowering of the source pressure in making a changeover from the fail mode to the non-fail mode.

7 Claims, 19 Drawing Sheets

CONTROL APPARATUS FOR VEHICULAR CONTINUOUSLY VARIABLE TRANSMISSION

INCORPORATION BY REFERENCE

The disclosure of Japanese Patent Application No. 2016-041549 filed on Mar. 3, 2016 including the specification, drawings and abstract is incorporated herein by reference in its entirety.

BACKGROUND

1. Technical Field

The present disclosure relates to the control of a continuously variable transmission with which a vehicle is equipped at the time of a fail mode.

2. Description of Related Art

In a vehicular continuously variable transmission whose speed ratio is controlled through the adjustment of an effective diameter of a pulley by a hydraulic actuator, when the oil pressure to the hydraulic actuator, which adjusts the effective diameter of the pulley, is maximized to ensure retreat running at the time of a fail in a power supply system, an excessive clamping force may be applied to the pulley. Therefore, there has been proposed an art of supplying an appropriate oil pressure to the hydraulic actuator even when an electromagnetic valve that controls the oil pressure of the actuator causes a fail in the power supply system. For example, a vehicular oil pressure control apparatus described in Japanese Patent Application Publication No. 2013-160379 (JP 2013-160379 A) is such an example.

SUMMARY

In the art of Japanese Patent Application Publication No. 2013-160379 (JP 2013-160379 A), an electromagnetic valve is provided between an oil passage through which an oil pressure is supplied to a hydraulic actuator that adjusts an effective diameter of a pair of pulleys and an oil passage through which an oil pressure is supplied to a hydraulic actuator that drives a clutch, so retreat running at the time of a fail is ensured, and the oil pressures are appropriately controlled. On the other hand, an excessive oil pressure can be restrained from being applied to the pulleys also by lowering a supply source pressure to the electromagnetic valve that supplies the oil pressures to the hydraulic actuators at the time of a fail. However, when the supply source pressure to the electromagnetic valve that supplies the oil pressures to the hydraulic actuators at the time of a fail is thus lowered, a shock may occur due to rapid operation of the hydraulic actuators resulting from a rapid rise in the oil pressures supplied to the hydraulic actuators at the time of a return from a fail mode to a non-fail mode. For example, when the supply source pressure to the electromagnetic valve at the time of the fail mode is lower than an output command oil pressure of the electromagnetic valve and the supply source pressure to the electromagnetic valve at the time of the return to the non-fail mode is higher than the output command oil pressure to the electromagnetic valve, an oil pressure higher than the output command oil pressure of the electromagnetic valve may be generated due to operational delay of the electromagnetic valve.

The present disclosure provides a control apparatus for a vehicular continuously variable transmission that can effectively restrain an oil pressure supplied to a hydraulic actuator from rapidly changing in making a return from a fail mode to a non-fail mode.

A control apparatus for a vehicular continuously variable transmission according to a first aspect of the present disclosure is provided. The vehicular continuously variable transmission includes a pair of pulleys. The control apparatus includes a pair of actuators, a pair of pulley pressure adjusting valves, a pair of electromagnetic valves, a source pressure adjusting valve and an electronic control unit. Each of the actuators are configured to adjust effective diameters of the pair of the pulleys respectively. Each of the pulley pressure adjusting valves are configured to supply control oil pressures to the pair of actuators respectively. The pair of the electromagnetic valves are configured to output command oil pressures to the pair of the pulley pressure adjusting valves respectively. The source pressure adjusting valve is configured to adjust a source pressure that is supplied to the pair of the electromagnetic valves. The electronic control unit is configured to (i) control the source pressure adjusting valve in such a manner as to lower the source pressure at a time of a fail mode below the source pressure at a time of a non-fail mode, at the time of the fail mode, and (ii) control command signals to the pair of the electromagnetic valves such that the command signals temporarily decrease below command signals at the time of the non-fail mode, before cancelling lowering of the source pressure in making a changeover from the fail mode to the non-fail mode.

With the control apparatus according to this aspect of the present disclosure, the command oil pressures that are supplied to the hydraulic actuators can be restrained from rapidly rising when the electromagnetic valves cannot sufficiently follow a rapid rise in the source pressure. As a result, a shock can be effectively restrained from occurring due to rapid operation of the hydraulic actuators when the command oil pressures to the actuators rapidly rise.

In the control apparatus according to the aforementioned aspect of the present disclosure, the electronic control unit may be configured to control the command signals in such a manner as to make the command signals correspond to an oil pressure equal to or lower than an oil pressure that is supplied to the source pressure adjusting valve at the time of the fail mode for a predetermined time set in advance, in making a changeover from the fail mode to the non-fail mode.

With the control apparatus according to this aspect of the present disclosure, the command oil pressures that are supplied to the hydraulic actuators can be more effectively restrained from rapidly rising when the electromagnetic valves cannot sufficiently follow a rapid rise in the source pressure. As a result, a shock can be more effectively restrained from occurring due to rapid operation of the hydraulic actuators when the command oil pressures to the actuators rapidly rise.

In the control apparatus according to the aforementioned aspect of the present disclosure, the electronic control unit may be configured to control the command signals in such a manner as to make the command signals correspond to an oil pressure equal to or lower than the source pressure at the time of the fail mode for a predetermined time set in advance, in making a changeover from the fail mode to the non-fail mode.

With the control apparatus according to this aspect of the present disclosure, the command oil pressures that are supplied to the hydraulic actuators can be more effectively restrained from rapidly rising when the electromagnetic valves cannot sufficiently follow a rapid rise in the source pressure. As a result, a shock can be more effectively restrained from occurring due to rapid operation of the hydraulic actuators when the command oil pressures to the actuators rapidly rise.

A control apparatus for a vehicular continuously variable transmission according to a second aspect of the present disclosure is provided. The vehicular continuously variable transmission includes an input-side pulley and an output-side pulley. The control apparatus includes an input-side actuator, an input-side pulley pressure adjusting valve, an output-side actuator, an output-side pulley pressure adjusting valve, a pair of electromagnetic valves, and an electronic control unit. The input side actuator is configured to adjust effective diameters of the input-side pulley. The input-side pulley pressure adjusting valve is configured to supply a control oil pressure to the input-side actuator that adjusts an effective diameter of the input-side pulley. The output-side pulley pressure adjusting valve is configured to supply a control oil pressure to the output-side actuator that adjusts an effective diameter of the output-side pulley. Each of the electromagnetic valves are configured to output command oil pressures to the input-side pulley pressure adjusting valve and the output-side pulley pressure adjusting valve respectively. The electronic control unit is configured to (i) make a changeover from a fail mode to a non-fail mode based on the command oil pressure to the input-side pulley pressure adjusting valve, and (ii) control the command oil pressure to the output-side pulley pressure adjusting valve in such a manner as to reduce a change in a speed ratio of the continuously variable transmission resulting from a changeover from the fail mode to the non-fail mode, before making the changeover from the fail mode to the non-fail mode.

With the control apparatus according to this aspect of the present disclosure, the speed ratio of the continuously variable transmission can be effectively restrained from changing in making a changeover from the fail mode to the non-fail mode, by adjusting the command pressure to the output-side pulley pressure adjusting valve that supplies an oil pressure to the hydraulic actuator that drives the output-side pulley, in accordance with the changeover from the fail mode to the non-fail mode.

In the control apparatus according to the aforementioned aspect of the present disclosure, the electronic control unit may be configured to set the command pressure to the output-side pulley pressure adjusting valve to a value that minimizes the speed ratio of the continuously variable transmission, during the fail mode.

With the control apparatus according to this aspect of the present disclosure, the speed ratio of the continuously variable transmission can be effectively restrained from changing in making a changeover from the fail mode to the non-fail mode.

In the control apparatus according to the aforementioned aspect of the present disclosure, the electronic control unit may be configured to set the command pressure to the output-side pulley pressure adjusting valve to a value that minimizes the speed ratio of the continuously variable transmission, before making a changeover from the fail mode to the non-fail mode.

With the control apparatus according to this aspect of the present disclosure, the speed ratio of the continuously variable transmission can be effectively restrained from changing in making a changeover from the fail mode to the non-fail mode.

In the control apparatus according to the aforementioned aspect of the present disclosure, the electronic control unit may be configured to start a changeover for setting the command oil pressure to the output-side pulley pressure adjusting valve to a value at which the speed ratio of the continuously variable transmission is minimized after making a determination on a changeover from the fail mode to the non-fail mode, and complete the changeover for setting the command oil pressure to the output-side pulley pressure adjusting valve to the value at which the speed ratio of the continuously variable transmission is minimized before making the changeover to the non-fail mode.

With the control apparatus according to this aspect of the present disclosure, the speed ratio of the continuously variable transmission can be effectively restrained from changing in making a changeover from the fail mode to the non-fail mode.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

One of the embodiments of the present disclosure will be described hereinafter in detail with reference to the drawings.

Figure 1:
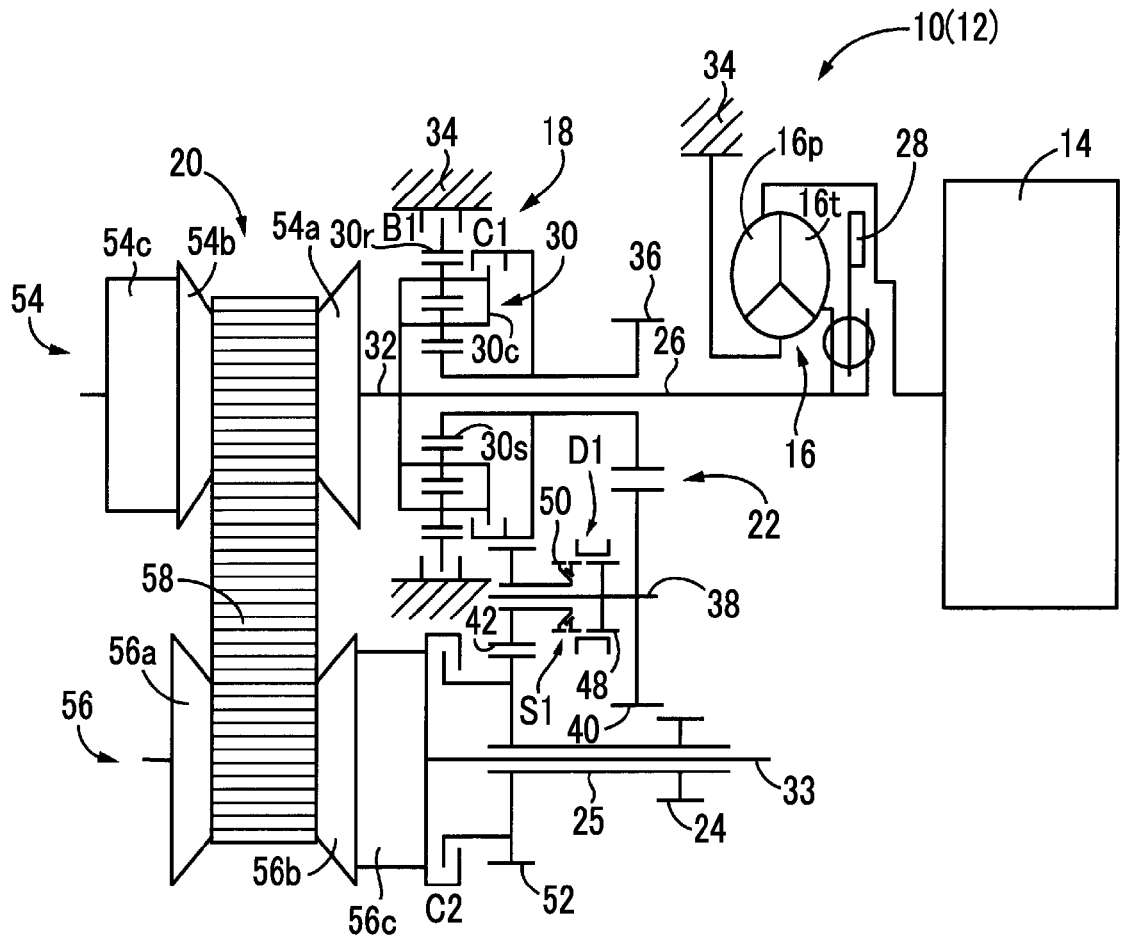
FIG. 1 is a skeleton diagram illustrating an automatic transmission to which the present disclosure is applied.

FIG. 1 is a skeleton diagram for illustrating the general configuration of a drive unit 12 with which a vehicle 10 is equipped as one of the embodiments of the present disclosure. The drive unit 12 is configured to include, for example, an engine 14 that is employed as a driving force source for running, a torque converter 16 as a fluid-type transmission device, a forward/backward changeover device 18, a belt-type continuously variable transmission 20 (hereinafter referred to as the continuously variable transmission 20), a gear mechanism 22, and an output shaft 25 on which an output gear 24 capable of transmitting power to driving wheels (not shown) is formed. In the drive unit 12, a torque (a driving force) that is output from the engine 14 is input to an input shaft 26 via the torque converter 16. In the drive unit 12, a first power transmission path through which this torque is transmitted from the input shaft 26 to the output shaft 25 via the continuously variable transmission 20, and a second power transmission path through which the torque input to the input shaft 26 is transmitted to the output shaft 25 via the gear mechanism 22 and the like are provided in parallel with each other. The drive unit 12 is configured such that a changeover between the power transmission paths is made in accordance with the running state of the vehicle 10.

The engine 14 is configured as an internal combustion engine, for example, a gasoline engine, a diesel engine or the like. The torque converter 16 is equipped with a pump impeller 16p that is coupled to a crankshaft of the engine 14, and a turbine impeller 16t that is coupled to the forward/backward changeover device 18 via the input shaft 26 corresponding to an output-side member of the torque converter 16, and transmits power via fluid. Besides, a lockup clutch 28 is provided between the pump impeller 16p and the turbine impeller 16t. The pump impeller 16p and the turbine impeller 16t are integrally rotated through complete engagement of this lockup clutch 28. Furthermore, an oil pump 64 that is driven by the engine 14 to generate an oil pressure, and the like are connected to the engine 14.

The forward/backward changeover device 18 is mainly constituted of a forward clutch C1, a backward brake B1, and a double pinion-type planetary gear device 30. A carrier 30c is integrally coupled to the input shaft 26 of the torque converter 16 and an input-side rotary shaft 32 of the continuously variable transmission 20. A ring gear 30r is selectively coupled to a housing 34 as a non-rotary member via the backward brake B1. A sun gear 30s is connected to a small-diameter gear 36. Besides, the sun gear 30s and the carrier 30c are selectively coupled to each other via the forward clutch C1. The forward clutch C1 and the backward brake B1 are equivalent to disconnection/connection devices, and are both hydraulic frictional engagement devices that are frictionally engaged by hydraulic actuators.

Besides, the sun gear 30s of the planetary gear device 30 is coupled to the small-diameter gear 36 constituting the gear mechanism 22. The gear mechanism 22 is configured to include the small-diameter gear 36 and a large-diameter gear 40 that is relatively unrotatably provided on a countershaft 38. An idler gear 42 is provided around the same rotation axis as the countershaft 38, unrotatably relatively to the countershaft 38. Besides, a meshing clutch D1 that selectively disconnects/connects the countershaft 38 and the idler gear 42 from/to each other is provided between the countershaft 38 and the idler gear 42. The meshing clutch D1 is configured to include a first gear 48 that is formed on the countershaft 38, a second gear 50 that is formed on the idler gear 42, and a hub sleeve (not shown) on which spline teeth (not shown) that can be fitted to (that can engage and mesh with) this first gear 48 and this second gear 50 are formed. The countershaft 38 and the idler gear 42 are connected to each other through the fitting of the hub sleeve to this first gear 48 and this second gear 50. Besides, the meshing clutch D1 is further equipped with a synchromesh mechanism S1 as a synchronization mechanism that synchronizes rotation of the first gear 48 and rotation of the second gear 50 with each other in fitting the first gear 48 and the second gear 50 to each other.

The idler gear 42 meshes with an input gear 52 that is larger in diameter than the idler gear 42. The input gear 52 is provided unrotatably relatively to the output shaft 25 that is arranged on a rotation axis common to a later-described output-side pulley 56 of the continuously variable transmission 20. The output shaft 25 is arranged rotatably around the rotation axis, and the input gear 52 and the output gear 24 are provided unrotatably relatively to each other. Thus, the forward clutch C1, the backward brake B1 and the meshing clutch D1 are interposed in the second power transmission path through which the torque of the engine 14 is transmitted from the input shaft 26 to the output shaft 25 via the gear mechanism 22.

Besides, a belt running clutch C2 that selectively disconnects/connects the continuously variable transmission 20 and the output shaft 25 from/to each other is interposed between the continuously variable transmission 20 and the output shaft 25. The first power transmission path through which the torque of the engine 14 is transmitted to the output shaft 25 via the input shaft 26 and the continuously variable transmission 20 is formed, through engagement of this clutch C2. Besides, when the clutch C2 is released, the first power transmission path is shut off, and no torque is transmitted from the continuously variable transmission 20 to the output shaft 25.

The continuously variable transmission 20 is provided in a power transmission path between the input-side rotary shaft 32 coupled to the input shaft 26 and the output shaft 25. The continuously variable transmission 20 is equipped with an input-side pulley 54 as a variable pulley which is provided on the input-side rotary shaft 32 and whose effective diameter is variable, the output-side pulley 56 as a variable pulley which is provided on an output-side rotary shaft 33 parallel to the input-side rotary shaft 32 and whose effective diameter is variable, and a transmission belt 58 that is wound around the pair of the variable pulleys 54 and 56. Power transmission is carried out via a frictional force between the pair of the variable pulleys 54 and 56 and the transmission belt 58.

The input-side pulley 54 is configured to be equipped with a fixed sheave 54a that is fixed to the input-side rotary shaft 32, a movable sheave 54b that is provided relatively unrotatably around an axis of the input-side rotary shaft 32 and movably in an axial direction thereof, and a primary-side hydraulic actuator 54c that generates a thrust force for moving the movable sheave 54b to change the width of a V-shaped groove between the fixed sheave 54a and the movable sheave 54b. Besides, the output-side pulley 56 is configured to be equipped with a fixed sheave 56a that is fixed to the output-side rotary shaft 33, a movable sheave 56b that is provided relatively unrotatably around an axis of the output-side rotary shaft 33 and movably in an axial direction thereof, and an output-side hydraulic actuator 56c that generates a thrust force for moving the movable sheave 56b to change the width of a V-shaped groove between the fixed sheave 56a and the movable sheave 56b.

A speed ratio $\gamma$ (=an input shaft rotational speed Nin (r.p.m)/an output shaft rotational speed Nout (r.p.m)) is continuously changed through changes in hanging diameter, namely, effective diameter of the transmission belt 58 resulting from changes in the width of the V-shaped groove of the pair of the variable pulleys 54 and 56. For example, when the width of the V-shaped groove of the input-side pulley 54 is narrowed, the speed ratio $\gamma$ is reduced. That is, the continuously variable transmission 20 is upshifted. Besides, when the width of the V-shaped groove of the input-side pulley 54 is widened, the speed ratio $\gamma$ is increased. That is, the continuously variable transmission 20 is downshifted.

Figure 2:
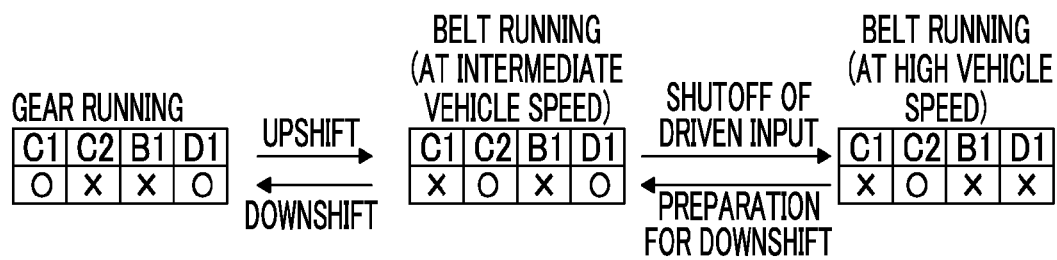
FIG. 2 is a view for illustrating changeovers in running pattern of the automatic transmission of FIG. 1.

The operation of the drive unit 12 configured as described above will be described hereinafter using an engagement chart of engagement elements for respective running patterns shown in FIG. 2. In FIG. 2, C1 corresponds to the operation state of the forward clutch C1, C2 corresponds to the operation state of the belt running clutch C2, B1 corresponds to the operation state of the backward brake B1, D1 corresponds to the operation state of the meshing clutch D1, "each circle" indicates engagement or connection, and "each cross" indicates release or shutoff. Incidentally, the meshing clutch D1 is equipped with a synchro mechanism S1. When the meshing clutch D1 is engaged, the synchro mechanism S1 operates.

First of all, the running pattern in which the torque of the engine 14 is transmitted to the output gear 24 via the continuously variable transmission 20 will be described. This running pattern corresponds to belt running (at high vehicle speed) in FIG. 2. As indicated by belt running in FIG. 2, while the belt running clutch C2 is connected, the forward clutch C1, the backward brake B1 and the meshing clutch D1 are shut off. The output-side pulley 56 and the output shaft 25 are connected to each other through connection of the belt running clutch C2, so the output-side pulley 56, the output shaft 25 and the output gear 24 are rotated integrally with one another. Accordingly, when the belt running clutch C2 is connected, the first power transmission path is formed, and the torque of the engine 14 is transmitted to the output gear 24 via the torque converter 16, the input shaft 26, the input-side rotary shaft 32, the continuously variable transmission 20 and the output shaft 25. At this time, the meshing clutch D1 is released during belt running when the torque of the engine 14 is transmitted via this first power transmission path for the purpose of eliminating the dragging of the gear mechanism 22 and the like during belt running and preventing the gear mechanism 22 and the like from rotating at high speed when the vehicle speed is high.

Subsequently, the running pattern in which the torque of the engine 14 is transmitted to the output gear 24 via the gear mechanism 22, namely, the running pattern in which the torque is transmitted through the second power transmission path will be described. This running pattern corresponds to gear running in FIG. 2. As shown in FIG. 2, while the forward clutch C1 and the meshing clutch D1 are engaged, the belt running clutch C2 and the backward brake B1 are released.

The planetary gear device 30 constituting the forward/backward changeover device 18 is integrally rotated through engagement of the forward clutch C1, so the small-diameter gear 36 is rotated at the same rotational speed as the input shaft 26. Besides, the small-diameter gear 36 is meshed with the large-diameter gear 40 that is provided on the countershaft 38, so the countershaft 38 is also rotated in the same manner. Furthermore, the meshing clutch D1 is engaged, so the countershaft 38 and the idler gear 42 are connected to each other. This idler gear 42 is meshed with the input gear 52, so the output shaft 25 and the output gear 24, which are provided integrally with the input gear 52, are rotated. In this manner, when the forward clutch C1 and the meshing clutch D1, which are interposed in the second power transmission path, are engaged, the torque of the engine 14 is transmitted to the output shaft 25 and the output gear 24 via the torque converter 16, the input shaft 26, the forward/backward changeover device 18, the gear mechanism 22, the idler gear 42 and the like.

The gear running is selected in a low vehicle speed region. The speed ratio $\gamma$ (the input shaft rotational speed Nin/the output shaft rotational speed Nout) based on this second power transmission path is set larger than the maximum speed ratio $\gamma$ of the continuously variable transmission 20. That is, the speed ratio $\gamma$ in the second power transmission path is set to a value that is not set in the continuously variable transmission 20. Then, when it is determined that a changeover to belt running should be made due to, for example, a rise in a vehicle speed V or the like, a changeover to the belt running is made. It should be noted herein that when a changeover from gear running to belt running (at high vehicle speed) or a changeover from belt running (at high vehicle speed) to gear running is made, this changeover is made transiently via belt running (at intermediate vehicle speed) in FIG. 2.

For example, when a changeover from belt running (at high vehicle speed) to gear running is made, a changeover from a state where the belt running clutch C2 is engaged to a state where the meshing clutch D1 is engaged in preparation for a changeover to gear running is transiently made.

At this time, rotation is also transmitted to the sun gear 30s of the planetary gear device 30 via the gear mechanism 22. From this state, the hanging replacement of the forward clutch C1 and the belt running clutch C2 is carried out. That is, the forward clutch C1 is engaged, and the belt running clutch C2 is shut off, so the power transmission path is changed over from the first power transmission path to the second power transmission path. At this time, the drive unit 12 is substantially downshifted.

Besides, when a changeover from gear running to belt running (at high vehicle speed) is made, a changeover from a state where the forward clutch C1 and the meshing clutch D1 are engaged as a state corresponding to gear running to a state where the belt running clutch C2 and the meshing clutch D1 are engaged is transiently made. That is, the hanging replacement of the forward clutch C1 and the belt running clutch C2 is started. At this time, the power transmission path is changed from the second power transmission path to the first power transmission path, and the drive unit 12 is substantially upshifted. Then, after the power transmission path is changed over, the meshing clutch D1 is released to prevent unnecessary dragging or prevent the gear mechanism 22 and the like from rotating at high speed.

Figure 3:
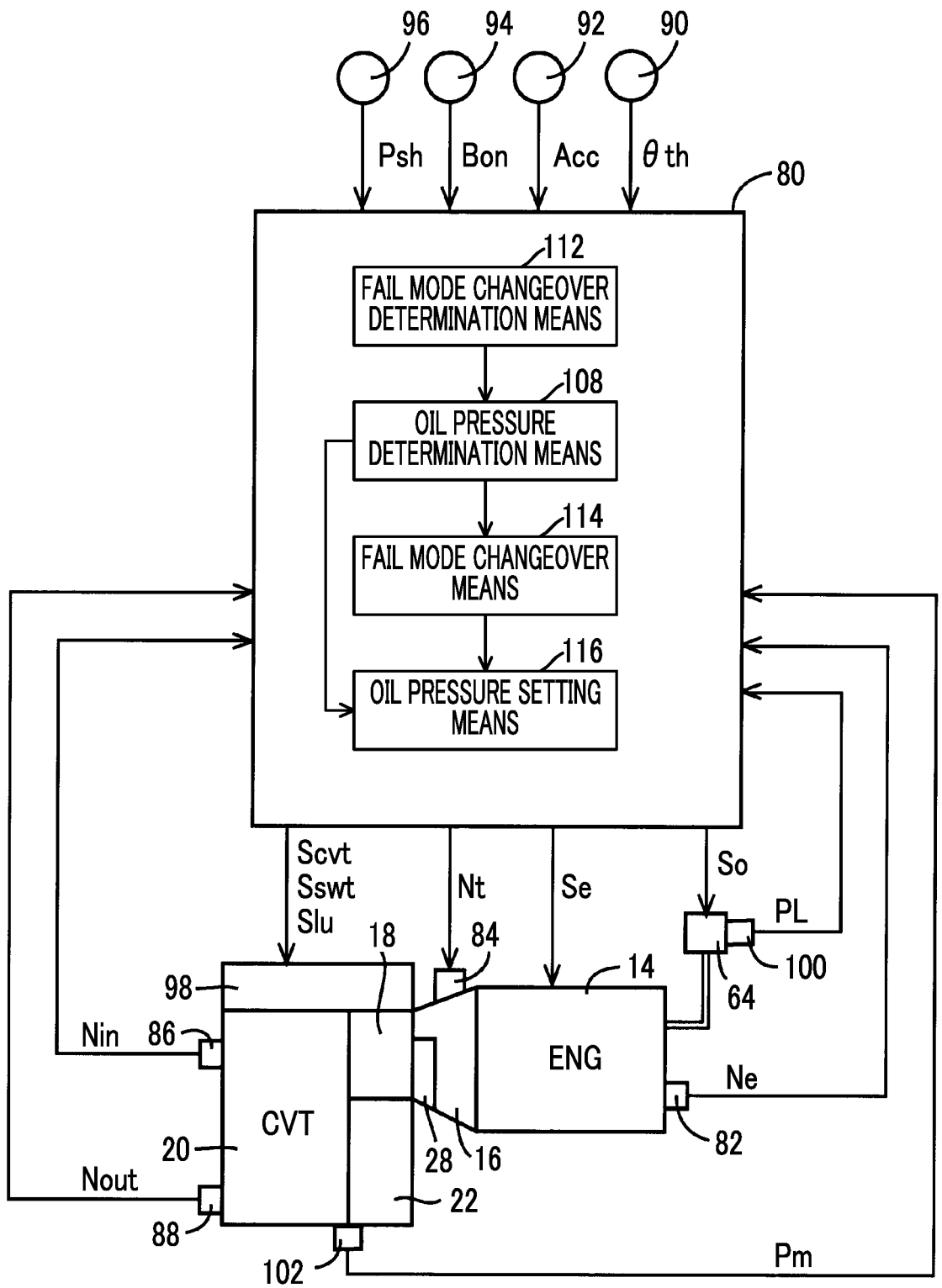
FIG. 3 is a view for illustrating an essential part of control functions and a control system for various kinds of control in a vehicle of FIG. 1.

In FIG. 3, a signal representing a rotational speed of the engine 14, namely, an engine rotational speed Ne as a detection result of an engine rotational speed sensor 82, a signal representing a rotational speed of the input shaft 26 (an input shaft rotational speed) Nt as a detection result of a turbine rotational speed sensor 84, a signal representing the input-side rotary shaft rotational speed Nin, that is, a rotational speed of the input-side rotary shaft 32 of the continuously variable transmission 20 or a rotational speed of the input-side pulley 54 as a detection result of an input shaft rotational speed sensor 86, a signal representing the output shaft rotational speed Nout, that is, a rotational speed of the output-side pulley 56 of the continuously variable transmission 20 corresponding to the vehicle speed V as a detection result of an output shaft rotational speed sensor 88, an output oil pressure PL of an oil pump 64 as a detection result of an oil pressure sensor 100, an output oil pressure Pm (Pa) of a pressure adjusting valve 70 as a detection result of an oil pressure sensor 102 with which a later-described hydraulic circuit is equipped, a signal representing a throttle opening degree θth of an electronic throttle valve as a detection result of a throttle sensor 90, a signal representing an accelerator opening degree Acc, that is, an operation amount of an accelerator pedal as an amount of request for acceleration by a driver as a detection result of an accelerator opening degree sensor 92, a signal representing a brake-on Bon condition indicating a state where a foot brake as a regular brake is operated as a detection result of a foot brake switch 94, a signal representing a lever position (an operational position) Psh of a shift lever as a detection result of a lever position sensor 96, and the like are supplied to an electronic control unit 80. Besides, the electronic control unit 80 sequentially calculates the speed ratio γ (=Nin/Nout) of the continuously variable transmission 20 based on, for example, the output shaft rotational speed Nout and the input shaft rotational speed Nin.

Besides, engine output control command signals Se for output control of the engine 14, oil pressure control command signals Scvt for oil pressure control regarding the shifting of the continuously variable transmission 20, oil pressure control command signals Sswt for controlling the forward/backward changeover device 18 (the forward clutch C1 and the backward brake B1), the belt running clutch C2 and the meshing clutch D1 that are associated with a changeover in the running pattern of the drive unit 12, an oil pressure control command signal Slu for controlling the lockup clutch 28, an oil pressure control command signal So for the control of an oil pressure PL of the oil pump 64, and the like are output from the electronic control unit 80. In concrete terms, a throttle signal for controlling the opening/closing of the electronic throttle valve by driving a throttle actuator, an injection signal for controlling the amount of fuel injected from a fuel injection device, an ignition timing signal for controlling the ignition timing of the engine 14 by an ignition device, and the like are output as the aforementioned engine output control command signals Se. Besides, a command signal for driving a linear solenoid valve that adjusts an input-side pressure Pin (Pa) that is supplied to the input-side hydraulic actuator 54c, a command signal for driving a linear solenoid valve (not shown) that adjusts an output-side pressure Pout (Pa) that is supplied to the output-side hydraulic actuator 56c, and the like are output to an oil pressure control circuit 98 as the aforementioned oil pressure control command signals Scvt. Furthermore, command signals for driving respective linear solenoid valves that control oil pressures supplied to the forward clutch C1, the backward brake B1, the belt running clutch C2 and the synchro mechanism 51, and the like are output to the oil pressure control circuit 98 as the oil pressure control command signals Sswt.

Next, the control functions of the electronic control unit 80 will be described. FIG. 3 is a functional block diagram illustrating an input/output system of the electronic control unit 80 that is provided in the vehicle 10 to control the engine 14, the continuously variable transmission 20 and the like and illustrating an essential part of the control functions performed by the electronic control unit 80. The electronic control unit 80 is configured to include a so-called microcomputer that is equipped with, for example, a CPU, a RAM, a ROM, an input/output interface and the like. The CPU performs various kinds of control of the vehicle 10 by carrying out a signal processing according to a program stored in advance in the ROM while utilizing a temporary storage function of the RAM.

Figure 4:
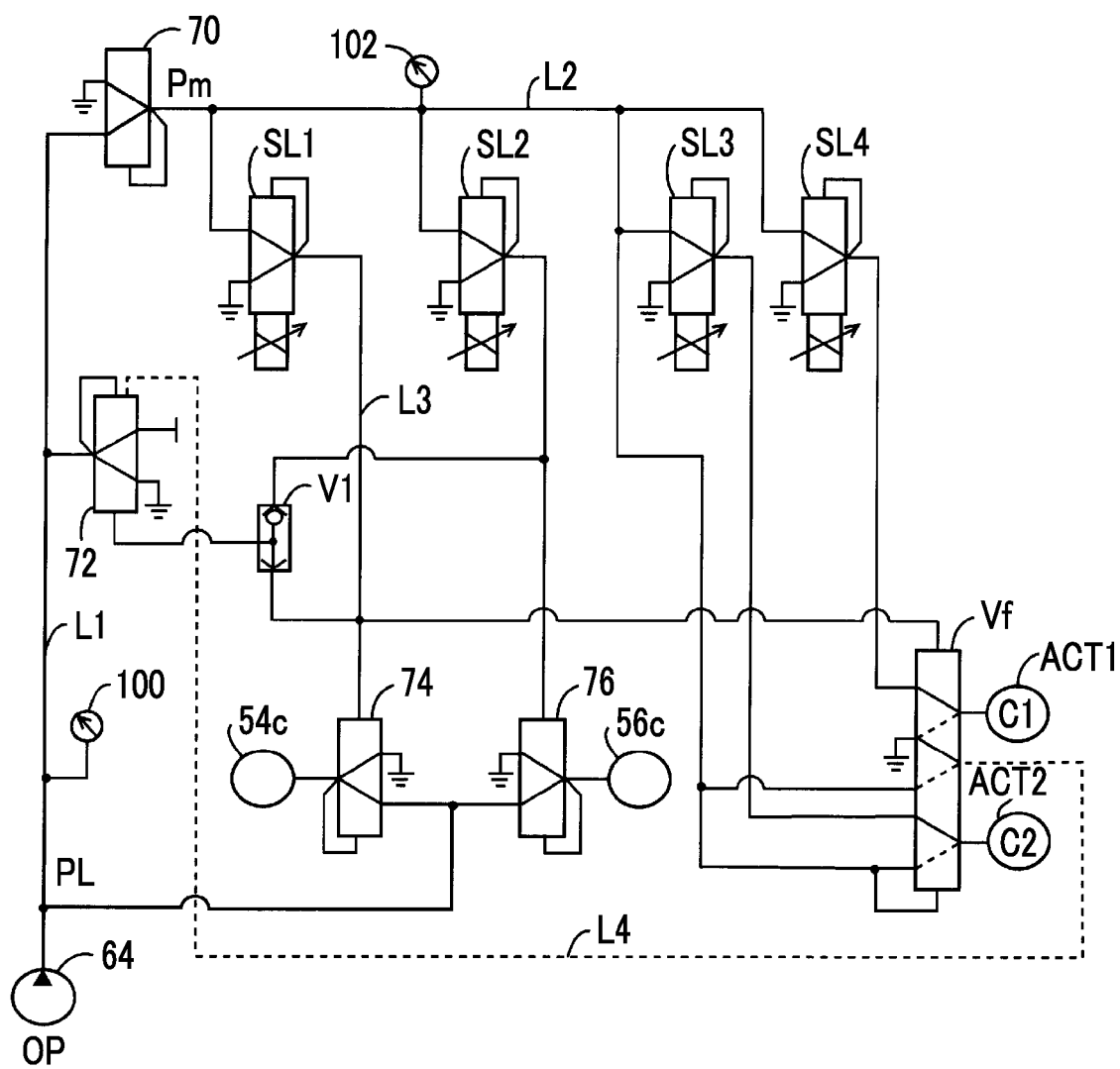
FIG. 4 is a view showing a hydraulic circuit that supplies oil pressures to actuators of the automatic transmission of FIG. 1.

FIG. 4 shows a hydraulic circuit in which retreat running is ensured through the supply of an oil pressure to an actuator ACT2 that drives the running clutch C2 in the case where a fail occurs in a power supply system due to the breaking of a wire or the like during the running by the continuously variable transmission 20 or in the case where an operational malfunction occurs in a linear solenoid valve SL3 that feeds an oil pressure to the running clutch C2 to adjust the pressure of the clutch C2, and in which a line oil pressure PL at the time of a fail is lowered to prevent an excessive oil pressure from being applied to the actuators 54c and 56c that drive the pulleys 54 and 56 of the continuously variable transmission 20. In the circuit of FIG. 4, the line oil pressure PL is supplied to an oil passage L1 from the oil pump 64 that is driven by the engine 14. An input-side pressure adjusting valve 74 that supplies an oil pressure to the input-side hydraulic actuator 54c that drives the movable sheave 54b of the input-side pulley 54, an output-side pressure adjusting valve 76 that supplies an oil pressure to the output-side hydraulic actuator 56c that drives the movable sheave 56b of the output-side pulley 56, a pressure adjusting relief valve 72 that lowers the line oil pressure PL at the time of a fail, a linear solenoid valve supply source pressure adjusting valve 70 that supplies a linear solenoid valve supply source pressure Pm to a linear solenoid valves SL1, a linear solenoid valve SL2, the linear solenoid valve SL3 and a linear solenoid valve SL4, and the oil pressure sensor 100 that detects the line oil pressure PL are connected to the oil passage L1. The linear solenoid valves SL1 to SL4, an oil pressure sensor 102 that detects the linear solenoid valve supply source pressure Pm, and an oil passage that is caused to communicate with an actuator ACT2 that drives the running clutch C2 at the time of a fail in a failsafe valve Vf are connected to an oil passage L2 on the output side of the linear solenoid valve supply source pressure adjusting valve 70. At the time of a fail, the linear solenoid valve supply source pressure Pm is supplied to the running clutch C2 and an oil passage L4 via the failsafe valve Vf, and the actuator that drives the forward clutch C1 is connected to a drain. Besides, at the time of normality, the linear solenoid valve SL3 is connected to the running clutch C2 via the failsafe valve Vf, and the linear solenoid valve SL4 is connected to the forward clutch C1 in the same manner. The linear solenoid valve SL1 supplies a command oil pressure of the input-side pressure adjusting valve 74 that supplies an oil pressure to the input-side hydraulic actuator 54c, via an oil passage L3. Also, the linear solenoid valve SL1 is connected to a shuttle valve V1 and the failsafe valve Vf, and supplies the failsafe valve Vf with a changeover signal for making a changeover between the time of a fail and the time of normality, namely, between a fail mode and a normal mode. The linear solenoid valve SL2 supplies the output-side hydraulic actuator 56c with a command oil pressure of the output-side pressure adjusting valve 76 that supplies an oil pressure to the output-side hydraulic actuator 56c, and is connected to the shuttle valve V1. The shuttle valve V1 supplies the higher one of command oil pressures Ps1 of the linear solenoid valve SL1 and the linear solenoid valve SL2 as a command oil pressure of the pressure adjusting relief valve 72. Incidentally, FIG. 4 shows the clutches C1 and C2 that are associated with the present disclosure. B1 and D1 are omitted in FIG. 4, and will be excluded from the following description.

In FIG. 4, a command oil pressure Spin from the linear solenoid valve SL1 to the input-side pulley pressure adjusting valve 74 that imparts an oil pressure to the input-side actuator 54c is used as a changeover signal pressure for making a changeover between the normal mode and the fail mode. The command oil pressure Spin from the linear solenoid valve SL1 is designed to become equal to an oil pressure higher than a value obtained by subtracting a value α set in advance from the linear solenoid valve supply source pressure Pm when non-energization is caused. Besides, the failsafe valve Vf is also set in such a manner as to be changed over from an oil passage in the normal mode indicated by a solid line to an oil passage in the fail mode indicated by a broken line when an oil pressure higher than a value obtained by subtracting the value α set in advance from the command oil pressure Spin at the time of a fail, namely, the linear solenoid valve supply source pressure Pm is input to the failsafe valve Vf. Therefore, at the time of a fail, the linear solenoid valve supply source pressure Pm is applied, as a pressure-lowering signal, to the pressure adjusting relief valve 72 that adjusts the line oil pressure PL, via the oil passage L4 that communicates with the pressure adjusting relief valve 72 at the time of a fail. Thus, the line oil pressure PL to the supply source pressure adjusting valve 70 falls. The linear solenoid valve supply source pressure Pm to the linear solenoid valves SL1 to SL4 becomes equal to the lowered line oil pressure PL. The aforementioned fail mode is also used in the control of temporarily stopping energization of the linear solenoid valve SL1 and continuously supplying an oil pressure to the running clutch C2 through a changeover to the fail mode, for example, in the case where the supply of an oil pressure to the running clutch C2 becomes impossible due to a malfunction in the linear solenoid valve SL3 that supplies an oil pressure to the running clutch C2 as well as in the case of a failure such as the breaking of a wire or the like.

Figure 5:
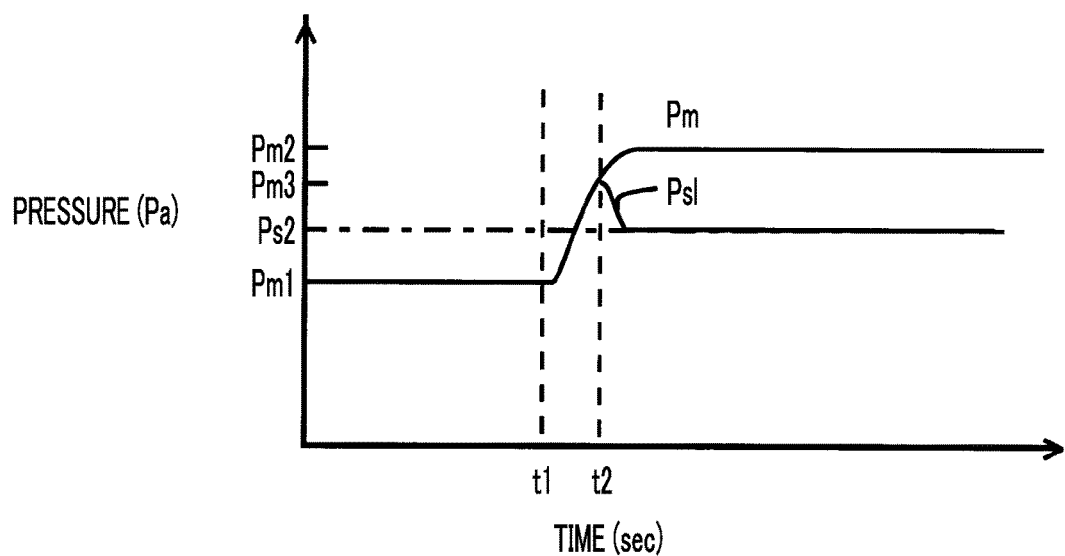
FIG. 5 is a view showing changes in pressure in making a changeover from a fail mode to a non-fail mode in the hydraulic circuit of FIG. 4.

However, in the hydraulic circuit of FIG. 4, when the supply source pressure Pm to the linear solenoid valves SL1 to SL4 is lower than a linear solenoid valve command signal pressure Ps2 as a command oil pressure to the linear solenoid valves SL1 to SL4 at the time of normality in making a changeover from the fail mode to the normal mode, a phenomenon of overshoot, namely, an excess over the command signal pressure Ps2 due to the inability of the linear solenoid valves SL1 to SL4 to follow may occur. FIG. 5 is a time chart in the case where a changeover from the fail mode to the normal mode is made by the failsafe valve Vf, and shows a case where the supply source pressure Pm to the linear solenoid valves SL1 to SL4 at the time of a fail is lower than the command signal pressure Ps2 (Pa) as a command value of the oil pressure to one of the linear solenoid valves SL1 to SL4 at the time of normality. For example, when the command signal pressure Ps2 to the linear solenoid valve SL2 at the time of normality is lower than the supply source pressure Pm to the linear solenoid valves SL1 to SL4 at the time of the fail mode, the supply source pressure Pm assumes a value Pmt lower than the command signal pressure Ps2 as a command value of the oil pressure to the linear solenoid valve SL2 at the time of the normal mode. At a time point t1 when a changeover from the fail mode to the normal mode is made by the failsafe valve Vf, the supply source pressure Pm assumes the value Pm1 lower than the command signal pressure Ps2 to the linear solenoid valve SL2 at the time of normality. At and after the time point t1, the supply source pressure Pm rapidly rises from Pmt toward Pm2 as a supply source pressure at the time of normality. At this time, the linear solenoid valve SL2 is changed over from a so-called non-adjusted state to an adjusted state, and the output oil pressure Ps1 to the linear solenoid valve SL2 cannot follow the command signal pressure Ps. As a result, the phenomenon of overshoot, namely, an excess over the command signal pressure Ps2 may occur. In FIG. 5, at a time point t2, the output oil pressure Ps1 to the linear solenoid valve SL2 temporarily assumes a value Pm3 as an oil pressure higher than the command signal pressure Ps2, and then falls to the command signal pressure Ps2. Incidentally, in the case where the linear solenoid valve command signal pressure has an individual command signal pressure, the aforementioned phenomenon of overshoot is possible only in that one of the linear solenoid valves in which the command signal pressure Ps2 exceeds the supply source pressure Pm at the time of a fail after a return to normality.

Returning to FIG. 3, the control functions of the electronic control unit 80 will be described. FIG. 3 shows an essential part of control functions and a control system in making a return from the fail mode to the normal mode in the case where the linear solenoid valve supply source pressure Pm that is supplied to the linear solenoid valves SL1 to SL4 at the time of a fail is lowered to keep an excessive oil pressure from being applied to the input-side pulley 54. Fail mode changeover determination means 112 makes a determination on the elimination of a fail condition, that is, a changeover from the fail mode to the normal mode from, for example, a recovery of a power supply, normality in the operation of the running clutch C2, the absence of other fail signals and the like. When it is determined that a changeover from the fail mode to the normal mode is possible, oil pressure determination means 108 compares an oil pressure at the time of a fail, for example, the line oil pressure PL measured by the oil pressure sensor 100 with the command signal pressure Ps2 to the linear solenoid valves SL1 to SL4 after a return to the normal mode, namely, a signal pressure target value. When the command signal pressure Ps2 to one of the linear solenoid valves SL1 to SL4 is higher than the line oil pressure PL1 at the time of a fail, namely, Pm1, the oil pressure determination means 108 outputs the command signal pressure Ps that is lower than the command signal pressure Ps2 at the time of normality, namely, a command signal for holding the signal pressure command value Ps1 for a predetermined time to oil pressure setting means 116. By outputting a command signal to fail mode changeover means at the same time, the oil pressure setting means 116 operates the linear solenoid valve SL1 that outputs a changeover oil pressure of the failsafe valve Vf, and a changeover to the normal mode is made. Incidentally, the signal pressure command value Ps1 is an oil pressure that is lower than the line oil pressure PL1 at the time of a fail, namely, Pm1 by a predetermined value. However, the signal pressure command value Ps1 can also be set to an oil pressure that is higher than the line oil pressure PL1 within such a range that the phenomenon of overshoot can be effectively restrained from occurring.

Figure 6:
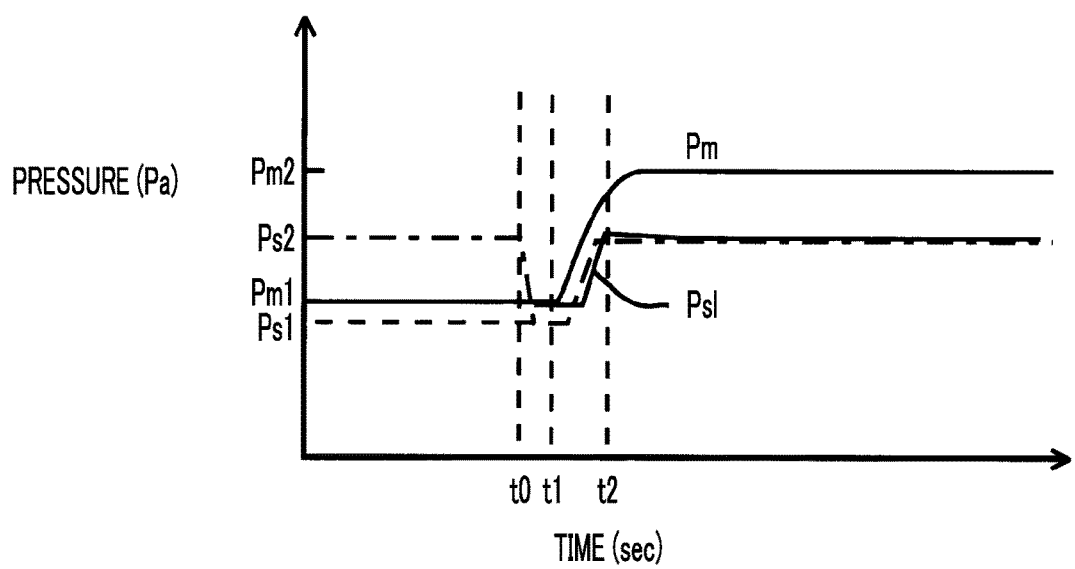
FIG. 6 is a view showing changes in command pressure of electromagnetic valves in the case where a command pressure signal of the electromagnetic valves is reduced for a predetermined time, in making a changeover from the fail mode to the non-fail mode in the hydraulic circuit of FIG. 4.

FIG. 6 is a time chart showing the setting of the command signal Ps for restraining the phenomenon of overshoot from occurring in making a changeover from the fail mode to the normal mode. At and before t0 at the time of a fail, the supply source pressure Pm to the linear solenoid valves SL1 to SL4 is equal to Pm1. When the command signal pressure Ps2 to one of the linear solenoid valves SL1 to SL4 at the time of normality is higher than the supply source pressure Pm1, the command signal pressure Ps to the linear solenoid valve which is higher than the supply source pressure Pm1 is so set as to be held equal to the signal pressure command value Ps1 as an oil pressure that is lower than the supply source pressure Pm by a predetermined pressure, for a predetermined time, at t0 when a determination on a changeover from the fail mode to the normal mode is made. At the time point t1 after the lapse of the predetermined time set in advance from the time point to, a changeover from the fail mode to the normal mode is made. The time for which the command signal pressure Ps is held equal to Ps1 as an oil pressure that is lower than Pmt is associated with the setting of the signal command pressure Ps1 with respect to the line oil pressure PL1, namely, a difference in oil pressure from Pmt, and is set to a time that sufficiently restrains the phenomenon of overshoot from occurring. At the time point t2, the command signal pressure Ps returns to the command signal pressure Ps2 at the time of normality, and the phenomenon of overshoot of the output oil pressure Ps1 is restrained from occurring. As time passes, the output oil pressure Ps1 is converged to the command signal pressure Ps2. Incidentally, an elapsed time from the time point t0 when a determination on a changeover from the fail mode to the normal mode is made to the time point t1 when the changeover is made, and a holding time for reducing the command signal Ps are set in advance to perform the aforementioned operation. However, the supply source pressure Pm, for example, an oil pressure signal from, for example, the oil pressure sensor 102 may be used to make a determination on a return from the reduced command signal Ps1 to the command signal pressure Ps2 at the time of normality. When the difference between the supply source pressure Pm and the command signal pressure Ps2 at the time of normality reaches a predetermined value, a determination on a changeover to the command signal pressure Ps2 at the time of normality may be made.

Figure 7:
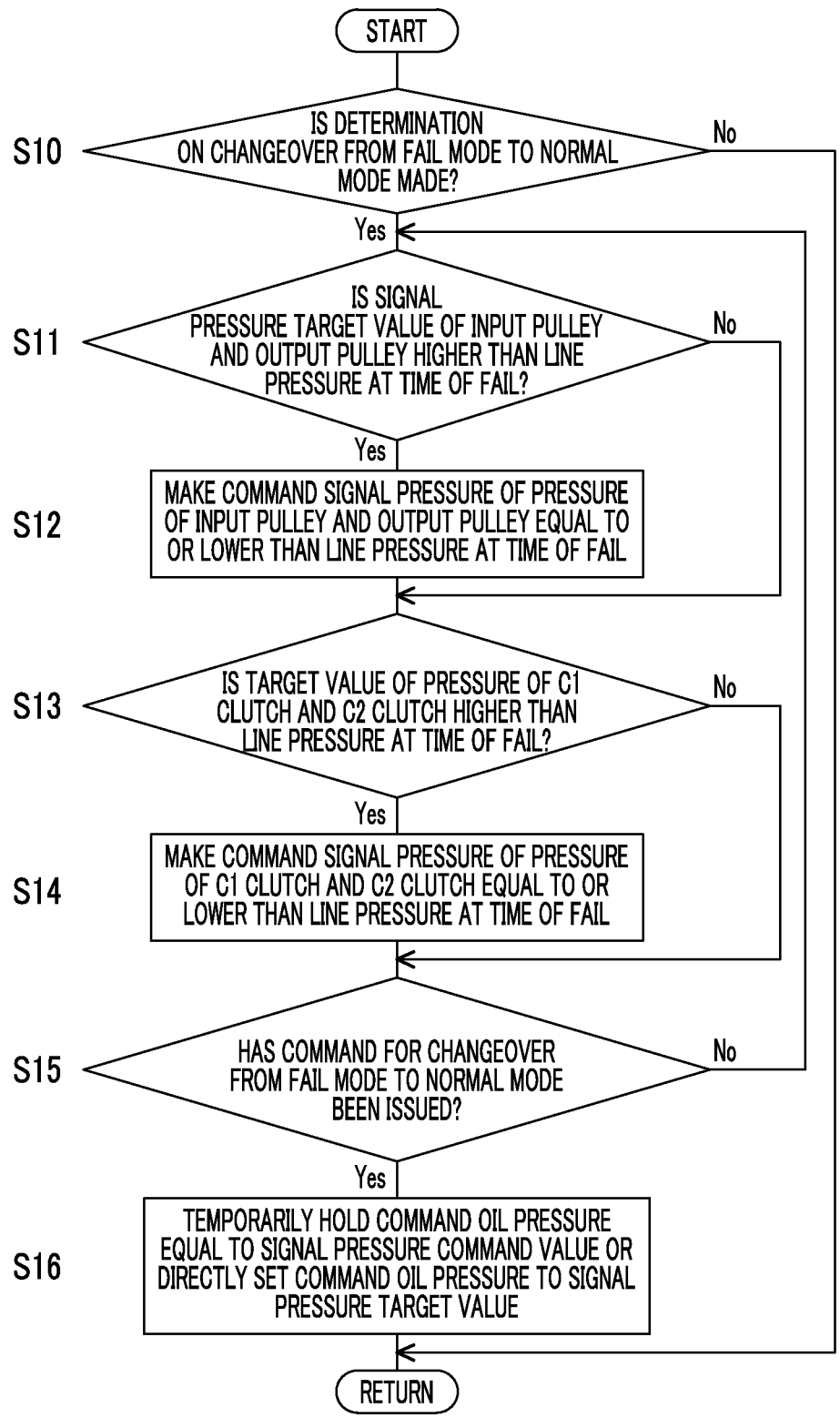
FIG. 7 is a flowchart illustrating an essential part of an operation of the hydraulic circuit in making a changeover from the fail mode to the non-fail mode in the hydraulic circuit of FIG. 4.

FIG. 7 is a flowchart showing an essential part of the control operation of the electronic control unit 80 shown in FIGS. 4 and 6, and this flowchart is repeatedly executed. In FIG. 7, in step S10 (the word "step" will be omitted hereinafter) corresponding to the fail mode changeover determination means 112, a determination on a changeover from the fail mode to the normal mode is made. If the result of this determination is regarded as negative, the present routine is ended. If the result of this determination is regarded as positive, it is determined in S11 corresponding to the oil pressure determination means 108 whether or not a signal pressure target value Ps of the input pulley and the output pulley, namely, the command signal pressure Ps2 that is set in making a return to the normal mode and that is output from the linear solenoid valves SL1 and SL2 to the input-side pressure adjusting valve 74 and the output-side pressure adjusting valve 76, which drive the input-side pulley 54 and the output-side pulley 56 respectively, is higher than the line oil pressure PL at the time of a fail. If the signal pressure target value Ps of one of the input pulley and the output pulley is higher than the line oil pressure PL at the time of a fail, the higher signal pressure target value Ps is set to the signal pressure command value Ps1 that is lower than the line oil pressure PL at the time of a fail by a predetermined pressure, in S12 corresponding to the oil pressure setting means 116. Besides, if the result of this determination is regarded as negative, the signal pressure target value Ps is held as the command signal pressure Ps2 as an original pressure without being changed. In S13 corresponding to the oil pressure determination means 108, it is determined whether or not the signal pressure target value Ps of the clutch C1 and the clutch C2, namely, the command signal pressure Ps2 that is set in making a return to the normal mode and that is output from the linear solenoid valves SL3 and SL4 to actuators ACT1 and ACT2, which drive the clutch C1 and the clutch C2 respectively, is higher than the line oil pressure PL at the time of a fail. If the command pressure target value Ps of one of the clutch C1 and the clutch C2 is higher than the line oil pressure PL at the time of a fail, the higher signal pressure target value Ps is set to the signal pressure command value Ps1 that is lower than the line oil pressure PL at the time of a fail by a predetermined pressure, in S14 corresponding to the oil pressure setting means 116. Besides, if the result of this determination is regarded as negative, the signal pressure target value Ps is held as the command signal pressure Ps2 as an original pressure without being changed. If a determination on a command to make a changeover from the fail mode to the normal mode is made in S15 corresponding to fail mode changeover means 114, the command oil pressure Ps that is set to the signal pressure command value Ps1 is held equal to the signal command value Ps1 for a predetermined time and then changed to the command pressure target value Ps, namely, the command signal pressure Ps2, in S16 corresponding to the oil pressure setting means 116. Besides, if the signal pressure target value Ps is equal to Ps2, the command oil pressure Ps is set to the command signal pressure Ps2 as soon as a determination on a command to make a changeover from the fail mode to the normal mode is made. Incidentally, in FIG. 7, different steps are applied to the input pulley and the output pulley or the clutch C1 and the clutch C2, but the respective corresponding steps may be carried out at the same time.

According to the present embodiment of the present disclosure, in the case where a changeover from the fail mode to the normal mode is made, that is, in the case where a changeover from the line oil pressure PL supplied to the linear solenoid valves SL1 to SL4 at the time of a fail, namely, the supply source pressure Pm1 at the time of a fail to the supply source pressure Pm at the time of normality is made, when the signal pressure target value Ps of the linear solenoid valves SL1 to SL4 to the actuators that operate the input-side pulley 54, the output-side pulley 56, the clutch C1 and the clutch C2 is higher than the supply source pressure Pm1 in the fail mode, the signal pressure target value Ps is temporarily reduced to the signal pressure command value Ps1 that is lower than Pm1. Thus, the phenomenon of overshoot as a temporary rise in the output oil pressure Ps1 of the linear solenoid valves SL1 to SL4 can be restrained from occurring when the source pressure Pm of the linear solenoid valves SL1 to SL4 rapidly rises. Besides, a shock can be effectively restrained from occurring due to rapid operation of the actuators resulting from the phenomenon of overshoot.

Although the embodiment of the present disclosure has been described above in detail based on the drawings, the present disclosure is also applicable to another aspect thereof.

Figure 8:
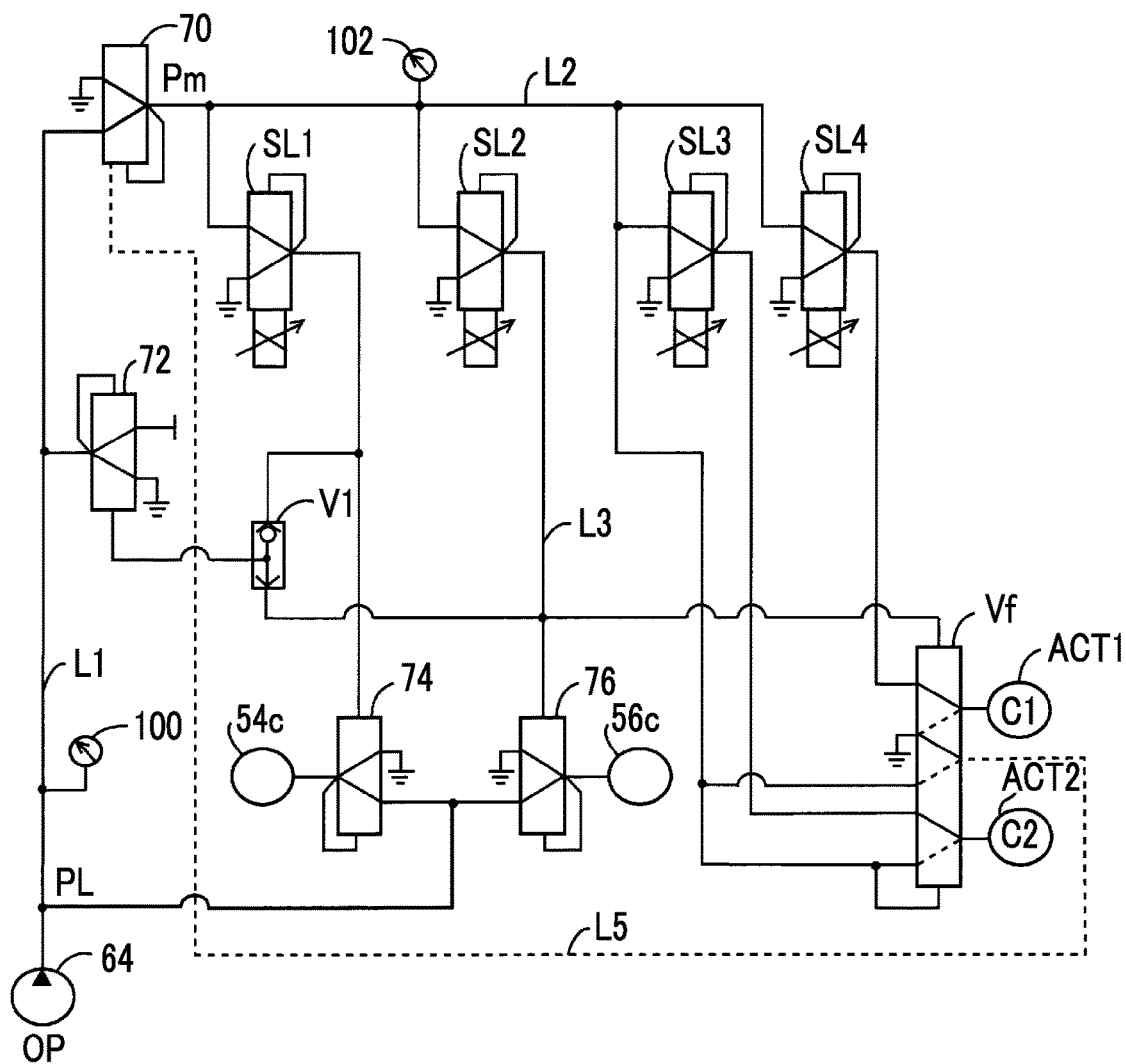
FIG. 8 is a view showing another exemplary hydraulic circuit that supplies oil pressures to the actuators of the automatic transmission of FIG. 1.

For example, FIG. 8 shows the same as the function of the hydraulic circuit of FIG. 4 described in the one of the embodiments of the present disclosure, so only a difference in structure will be described. In FIG. 8, at the time of a fail, the linear solenoid valve supply source pressure Pm is supplied as a pressure-lowering command oil pressure of the linear solenoid valve supply source pressure adjusting valve 70 that supplies the linear solenoid valve supply source pressure Pm to the linear solenoid valves SL1 to SL4, due to coupling to an oil passage L5 via the failsafe valve Vf. Incidentally, as is the case with FIG. 4, the description of B1 and D1 is omitted. In the hydraulic circuit of FIG. 8 as well as the hydraulic circuit of FIG. 4, in the case where a changeover from the fail mode to the normal mode is made, when the linear solenoid valve command signal pressure Ps as a command oil pressure to the linear solenoid valves SL1 to SL4 at the time of normality is higher than the supply source pressure Pm to the linear solenoid valves SL1 to SL4, the phenomenon of overshoot, namely, an excess over the command signal Ps due to the inability of the linear solenoid valves SL1 to SL4 to follow may occur.

Figure 9:
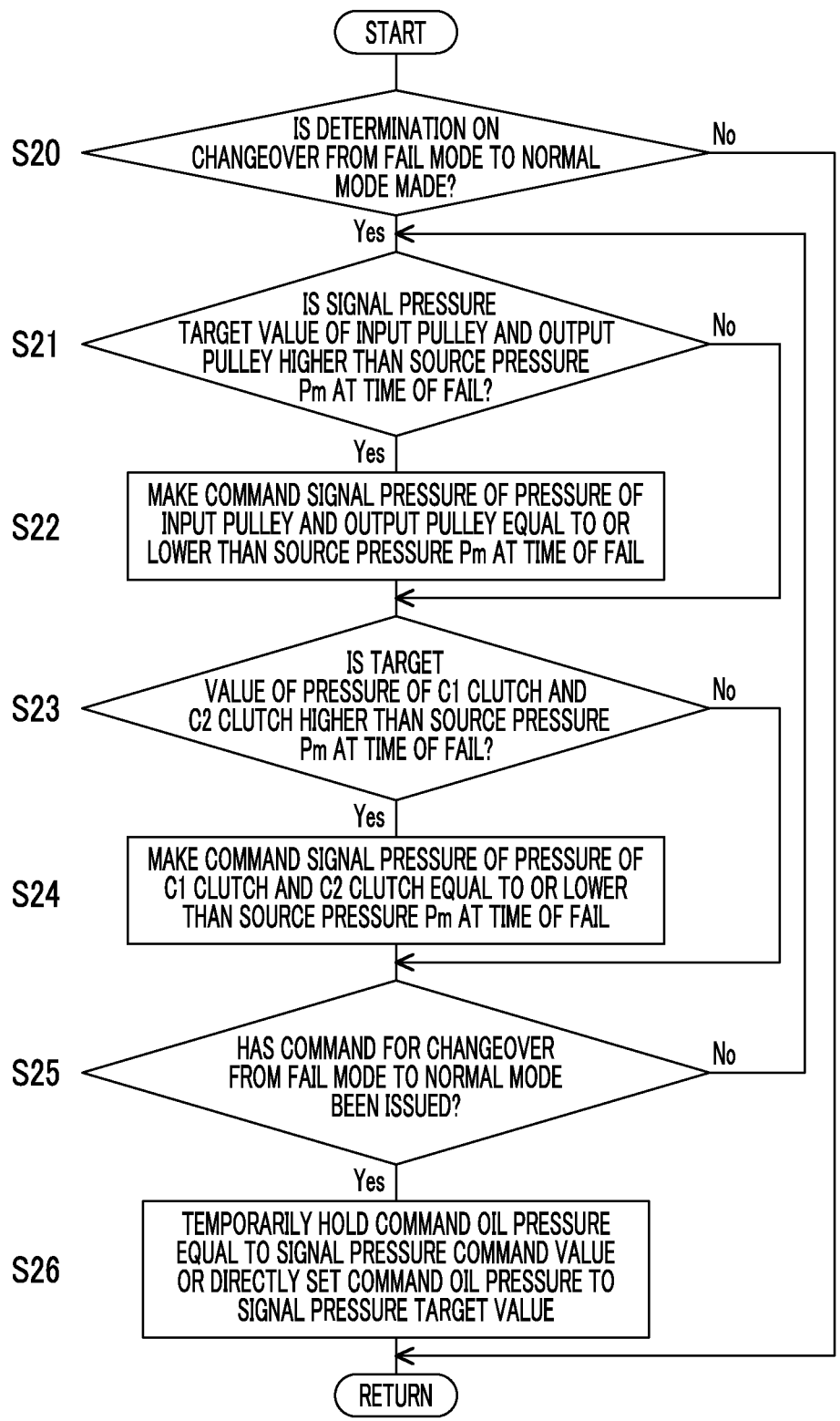
FIG. 9 is a flowchart illustrating an essential part of an operation of the hydraulic circuit in making a changeover from a fail mode to a non-fail mode in the hydraulic circuit of FIG. 8.

FIG. 9 is a flowchart showing an essential part of a control operation of restraining the phenomenon of overshoot from occurring when a changeover from the fail mode to the normal mode is made, and this flowchart is repeatedly executed. While the line oil pressure PL at the time of a fail is compared with the signal pressure target value Ps at the time of normality in the flowchart shown in FIG. 7, the source pressure Pm to the linear solenoid valves SL1 to SL4 at the time of a fail is compared with the signal pressure target value Ps in the flowchart of FIG. 9. When the source pressure Pm to the linear solenoid valves SL1 to SL4 at the time of a fail is lower than the signal pressure target value Ps, the signal command pressure Ps is temporarily reduced and set to the signal pressure Ps1 at the time of a changeover from the fail mode to the normal mode. Except this, the same control operation as in the flowchart of FIG. 7 is performed.

According to the present embodiment of the present disclosure, in the case where a changeover from the fail mode to the normal mode is made, namely, in the case where a changeover from the supply source pressure Pm supplied to the linear solenoid valves SL1 to SL4 at the time of a fail to the supply source pressure Pm at the time of normality is made, when the output oil pressure Ps1 of the linear solenoid valves SL1 to SL4 to the actuators that operate the input-side pulley 54, the output-side pulley 56, the clutch C1 and the clutch C2 is higher than the supply source pressure Pm1 in the fail mode, the output oil pressure Ps1 is temporarily lowered to the signal pressure command value Ps1 that is lower than Pm1. Thus, the phenomenon of overshoot, namely, a temporary rise in the output oil pressure Ps1 of the linear solenoid valves SL1 to SL4 can be effectively restrained from occurring when the source pressure Pm of the linear solenoid valves SL1 to SL4 rapidly rises. Thus, a shock can be effectively restrained from occurring due to rapid operation of the actuators.

Next, another one of the embodiments of the present disclosure will be described with reference to the drawings. An automatic transmission to which the present disclosure is applied is the same as that of the foregoing embodiment of the present disclosure, so only the difference therebetween will be described.

Figure 10:
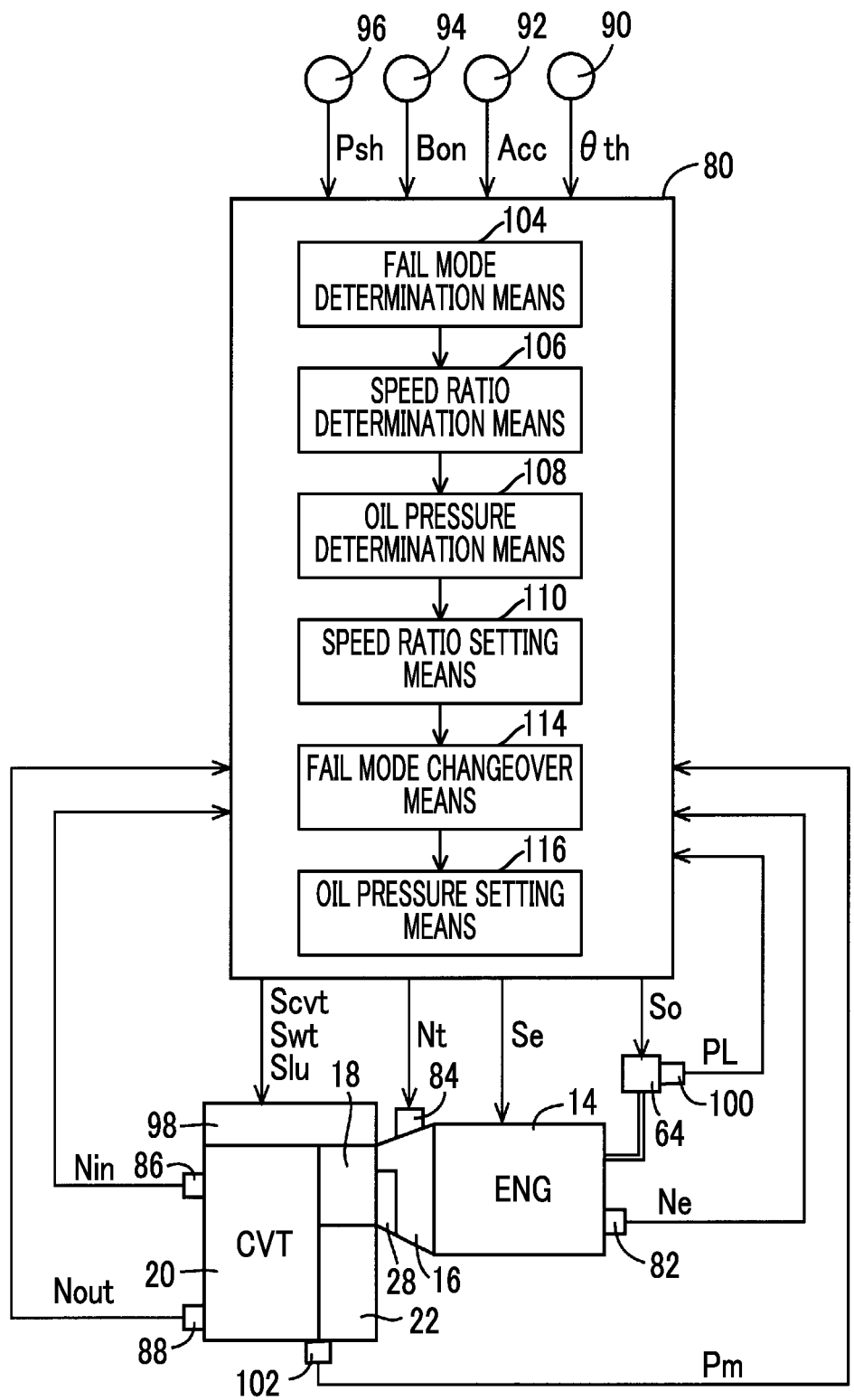
FIG. 10 is a view illustrating another example of the essential part of control functions and a control system for various kinds of control in a vehicle of FIG. 1.

In FIG. 10, the control functions of the electronic control unit 80 will be described. FIG. 10 shows an essential part of control functions, a control system and the like of a hydraulic circuit which is equipped with the linear solenoid valves SL1 and SL2 that supply a command oil pressure to the pair of the actuators 54c and 56c that drive the pair of the pulleys 54 and 56 of the continuously variable transmission 20 respectively, and which makes a changeover from the fail mode to the normal mode through the command signal pressure Ps to the input-side pulley pressure adjusting valve 74 that supplies an oil pressure to the input-side hydraulic actuator 54c. In the control, in the case where, for example, an operational malfunction occurs in the linear solenoid valve SL3 for adjusting the pressure of the clutch C2 that feeds an oil pressure to the running clutch C2, and a return from the fail mode to the normal mode is made in the fail mode in which the power supply to the linear solenoid valve SL1 is stopped from being energized and at least the linear solenoid valve SL2 continues to be energized, the command signal pressure Ps of the linear solenoid valve SL2 that supplies a command oil pressure to the hydraulic actuator 56c that drives the output-side pulley 56 is adjusted before making a changeover from the fail mode and the normal mode. Thus, the speed ratio of the continuously variable transmission is restrained from changing in making a changeover from the fail mode to the normal mode. In the electronic control unit 80, fail mode determination means 104 determines whether the failsafe valve is in the fail mode or the normal mode. If the failsafe valve is in the fail mode, speed ratio determination means 106 makes a determination on a speed ratio γ1 in the fail mode, and oil pressure determination means 108 makes a determination on an input-side pulley pressure Pin2 (Pa) to the input-side pulley 54 after a return to the normal mode. Speed ratio setting means 110 compares the speed ratio γ1 in the fail mode with a speed ratio γ2 after a changeover to the normal mode, and determines whether or not the difference therebetween is larger than a predetermined value α. If the difference is larger than the predetermined value α, the speed ratio setting means 110 makes a determination on an output-side pulley pressure Pout2 (Pa) at which the absolute value of the difference between the speed ratios γ1 and γ2 is equal to α. Incidentally, the absolute value of the difference between the speed ratios γ1 and γ2 is set to α, but may also be set to a value that is smaller than a by a predetermined value. The fail mode changeover means 114 makes a determination on a changeover from the fail mode to the normal mode. Oil pressure setting means 116 sets oil pressures to the input-side pulley pressure Pin2 in the normal mode determined by the oil pressure determination means 108 and the output-side pulley pressure Pout2 determined by the speed ratio setting means 110. Thus, the change from the speed ratio γ1 in the fail mode to the speed ratio γ2 in the normal mode is equal to or smaller than the predetermined value α. As a result, a shock is restrained from occurring when the continuously variable transmission 20 is changed over from the fail mode to the normal mode.

Figure 11:
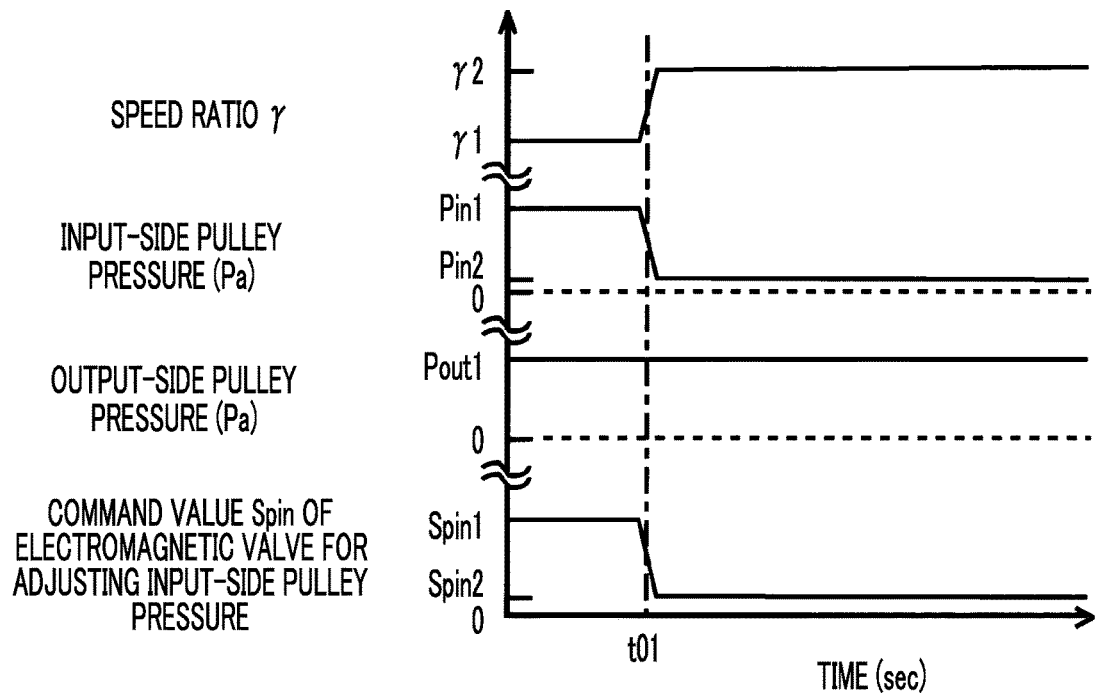
FIG. 11 is a view showing fluctuations in speed ratio resulting from changes in input-side pulley pressure, in making a changeover from the non-fail mode to the fail mode in the hydraulic circuit of each of FIGS. 4 and 8.
Figure 12:
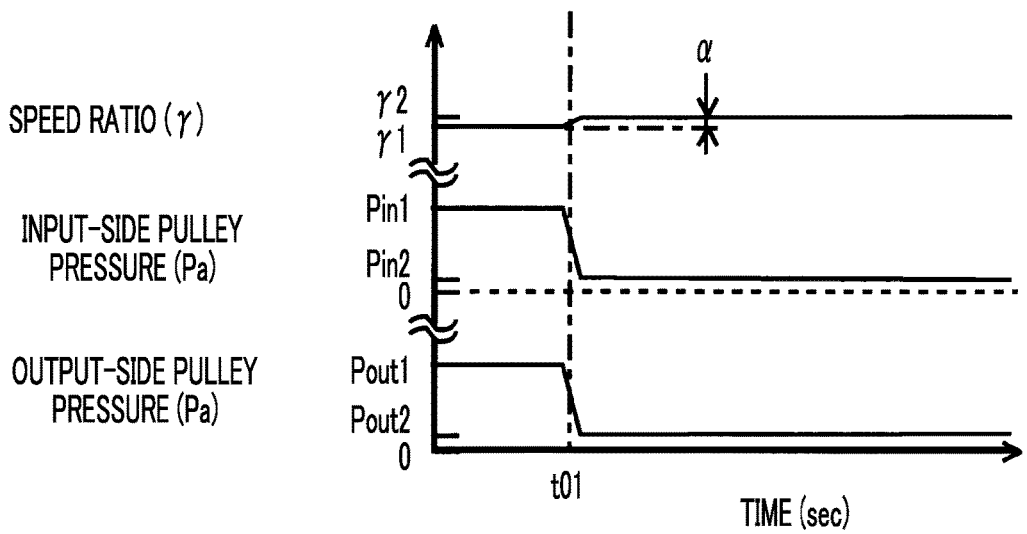
FIG. 12 is a view showing changes in speed ratio in the case where an output-side pulley pressure is fluctuated in accordance with changes in input-side pulley pressure in FIG. 11.

FIG. 11 shows a time chart in the case where the output-side pulley pressure Pout2 is not adjusted in making a changeover from the fail mode to the normal mode. FIG. 11 shows an electromagnetic valve command value Spin for adjusting the pressure of the input-side pulley, namely, the command signal pressure Ps from the linear solenoid valve SL1 to the input-side pressure adjusting valve 74 and the input-side pulley pressure Pin. However, the electromagnetic valve command value Spin for adjusting the pressure of the input-side pulley is a command signal pressure that controls the input-side pulley pressure Pin, and shifts in the same manner as the input-side pulley pressure Pin. Therefore, the command signal pressures to the input-side pressure adjusting valve 74 and the output-side pressure adjusting valve 76 will be omitted hereinafter, and the following description will be given using only the input-side pulley pressure Pin and the output-side pulley pressure Pout. In the fail mode, namely, at and before a time point t01, the input-side pulley pressure Pin is used as a signal pressure of the failsafe valve Vf, and is held equal to a pressure Pin1 at which the failsafe valve Vf is in the fail mode. The output-side pulley pressure Pout is set to a post-output pulley pressure Pout1. When the failsafe valve Vf is changed over from the fail mode to the normal mode at the time point t01, the input-side pulley pressure Pin is lowered from the fail signal pressure Pin1 in the fail mode to the input-side pulley pressure Pin2 in the normal mode. The speed ratio γ suddenly changes to γ2, which is different from the speed ratio γ1 at the time of a fail, at the time point t01. FIG. 12 is a time chart showing an operation of controlling the output-side pulley pressure Pout such that the change in the speed ratio γ is confined within a range equal to or smaller than the predetermined value α in making a changeover from the fail mode to the normal mode. In FIG. 12, at the time of the fail mode, namely, at and before the time point t01, a determination on the speed ratio γ1 and the input-side pulley pressure Pin2 after a return to the normal mode is made. Based on this determination, a determination on the speed ratio γ2 at the time of the normal mode is made. When the absolute value of the difference between γ1 and γ2 is larger than the predetermined value α, the output-side pulley pressure Pout is changed to the predetermined value α. When the absolute value of the difference between γ1 and γ2 is equal to or smaller than the predetermined value α, the output-side pulley pressure Pout is not changed, so the output-side pulley pressure Pout2 at which the speed ratio γ is equal to or smaller than the predetermined value α is selected.

Figure 13:
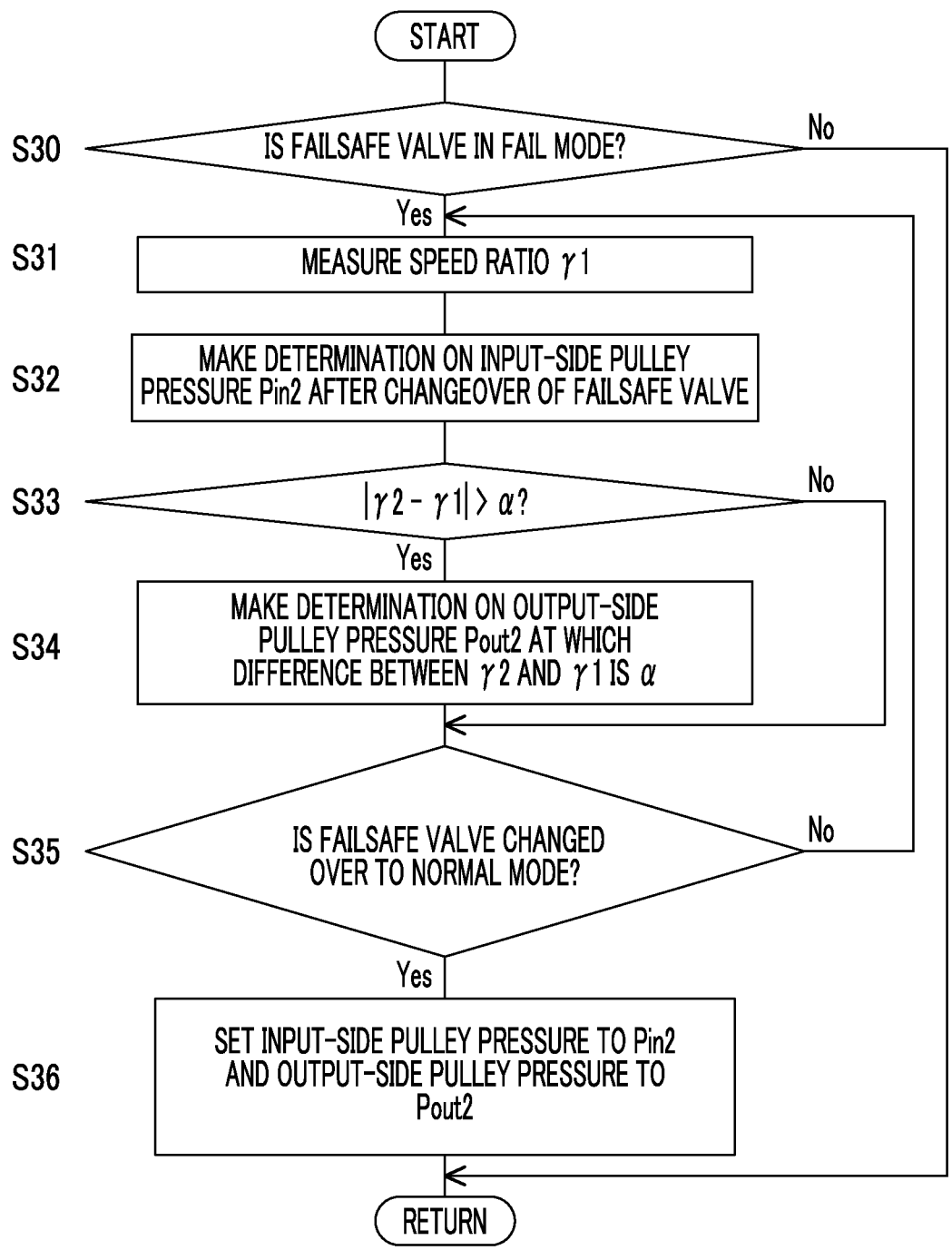
FIG. 13 is a flowchart illustrating an essential part of an operation of an electronic control unit in making a changeover from a fail mode to a non-fail mode in an electronic control unit of FIG. 10.

FIG. 13 is a flowchart showing an essential part of a control operation of restraining the speed ratio γ from changing when a changeover from the fail mode to the normal mode is made, and this flowchart is repeatedly executed. In S30 corresponding to the fail mode determination means 104, it is determined whether or not the failsafe valve Vf is in the fail mode. If the result of this determination is regarded as negative, the present routine is ended. If the result of this determination is regarded as positive, a determination on the speed ratio γ1 at the time of the fail mode is made in S31 corresponding to the speed ratio determination means 106. Besides, in S32 corresponding to the oil pressure determination means 108, a determination on the input-side pulley pressure Pin2 as the input-side pulley pressure Pin after a return to the normal mode is made. In S33 corresponding to the speed ratio setting means 110, it is determined whether or not the absolute value of the difference between the speed ratio γ1 at the time of a fail and the speed ratio γ2 at the time of normality is equal to or larger than the predetermined value α. If the result of this determination is regarded as positive, a determination on the output-side pulley pressure Pout2 at which the absolute value of the difference between the speed ratio γ1 at the time of a fail and the speed ratio γ2 at the time of normality is equal to the predetermined value α is made, in S34 corresponding to the speed ratio setting means 110. If the result of a determination on a changeover of the failsafe valve Vf to the normal mode is regarded as negative in S35 corresponding to the fail mode changeover means 114, the control operation starting from S31 is repeated. If the result of this determination is regarded as positive, namely, if a determination on a changeover from the fail mode to the normal mode is made, the input-side pulley pressure Pin is set to Pin2, and the output-side pulley pressure Pout is set to Pout2, in S36 corresponding to the oil pressure setting means 116.

According to the present embodiment of the present disclosure, when a changeover to the fail mode is made through the output oil pressure Ps1 of the linear solenoid valve SL1 to the actuator that operates the input-side pulley 54, the command oil pressure Ps1 to the pressure adjusting valve 74 that supplies an oil pressure to the actuator of the input pulley 54 changes, so the speed ratio γ may rapidly change. Therefore, when the absolute value of the difference between the speed ratio γ1 at the time of a fail and the speed ratio γ2 at the time of normality is larger than the predetermined value α, the output-side pulley pressure Pout2 is set such that the absolute value of the difference between the speed ratio γ1 at the time of a fail and the speed ratio γ2 at the time of normality becomes equal to the predetermined value α. Thus, the change in the speed ratio γ in making a changeover from the fail mode to the normal mode is confined within the range equal to or smaller than the predetermined value α.

The present disclosure is also applicable to still another aspect thereof. An automatic transmission to which the present disclosure is applied as to still another one of the embodiments of the present disclosure is the same as in the foregoing embodiments of the present disclosure, so only the difference therebetween will be described.

Figure 14:
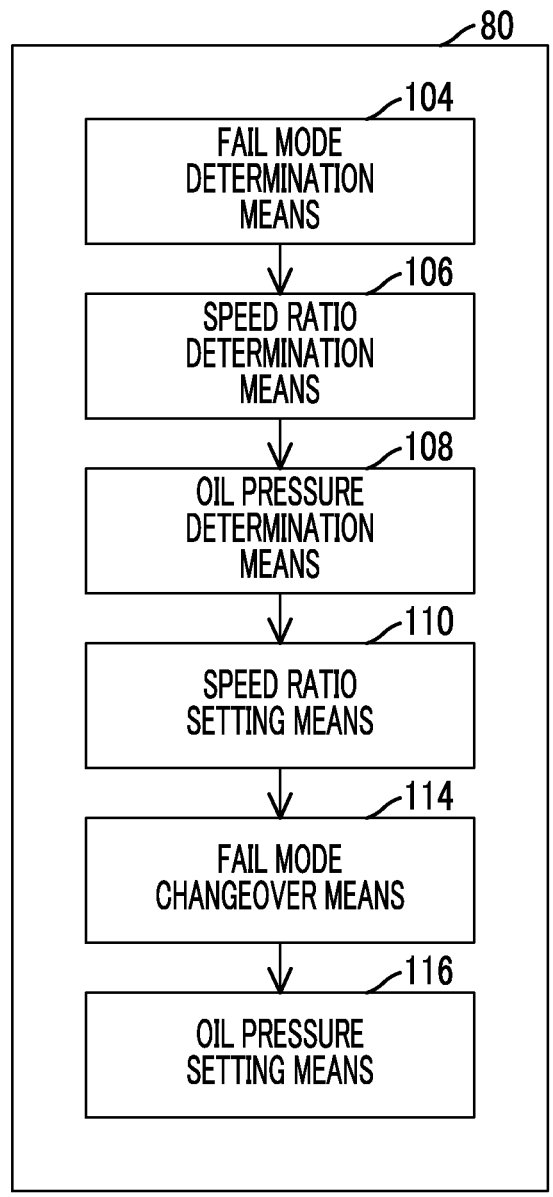
FIG. 14 is a view illustrating another example of the essential part of control functions and a control system for various kinds of control in the vehicle of FIG. 1.

In FIG. 14, the control functions of the electronic control unit 80 in the case where, for example, an operational malfunction occurs in the linear solenoid valve SL3 for adjusting the pressure of the clutch C2 that feeds an oil pressure to the running clutch C2 and a return from the fail mode to the normal mode is made in the fail mode in which the power supply to the linear solenoid valve SL1 is stopped from being energized and at least the linear solenoid valve SL2 continues to be energized will be described. In the electronic control unit 80, the fail mode determination means 104 determines whether the failsafe valve is in the fail mode or the normal mode. If the failsafe valve is in the fail mode, the speed ratio determination means 106 makes a determination on the speed ratio γ1 in the fail mode. The oil pressure determination means 108 makes a determination on the input-side pulley pressure Pin2 of the input-side pulley 54 after a return to the normal mode. Even after a changeover of the failsafe valve, the speed ratio setting means 110 sets Pout2 as the output-side pulley pressure at which the speed ratio γ is equal to a minimum speed ratio γmin. The fail mode changeover means 114 makes a determination on a changeover from the fail mode to the normal mode, and the oil pressure setting means 116 sets the input-side pulley pressure Pin2. The speed ratio γ in making a changeover from the fail mode to the normal mode is changed over to γmin, and the speed ratio γ in the normal mode is also set to γmin. Therefore, the speed ratio γ is restrained from changing in making a changeover from the fail mode to the normal mode, and a shock is effectively restrained from occurring in changing over the continuously variable transmission 20 from the fail mode to the normal mode.

Figure 15:
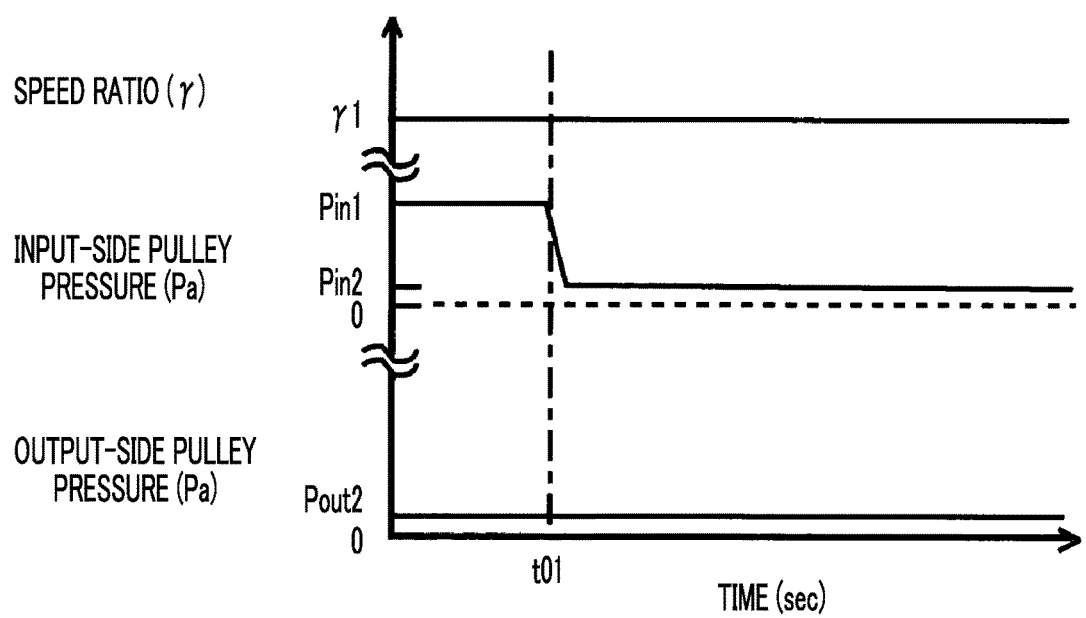
FIG. 15 is a view showing changes in speed ratio in the case where the output-side pulley pressure is equal to a pressure at which the speed ratio is minimized, during the fail mode in FIG. 14.

FIG. 15 shows a time chart in adjusting the output-side pulley pressure Pout2 before making a changeover from the fail mode to the normal mode. As soon as the fail mode is entered, a determination on the speed ratio γ1 and the input-side pulley pressure Pin2 after a return to the normal mode is made. Based on this determination, a determination on the output-side pulley pressure Pout2 at which the speed ratio γ is equal to the minimum speed ratio γmin both in the fail mode and the normal mode is made. The output-side pulley pressure Pout is set to the determined output-side pulley pressure Pout2. When a determination on a changeover to the fail mode is made at the time point t01, the input-side pulley pressure Pin is changed over to the input-side pulley Pin2 in the normal mode. However, the speed ratio γ is set to the minimum speed ratio γmin in the fail mode and the normal mode, and the speed ratio γ does not change.

Figure 16:
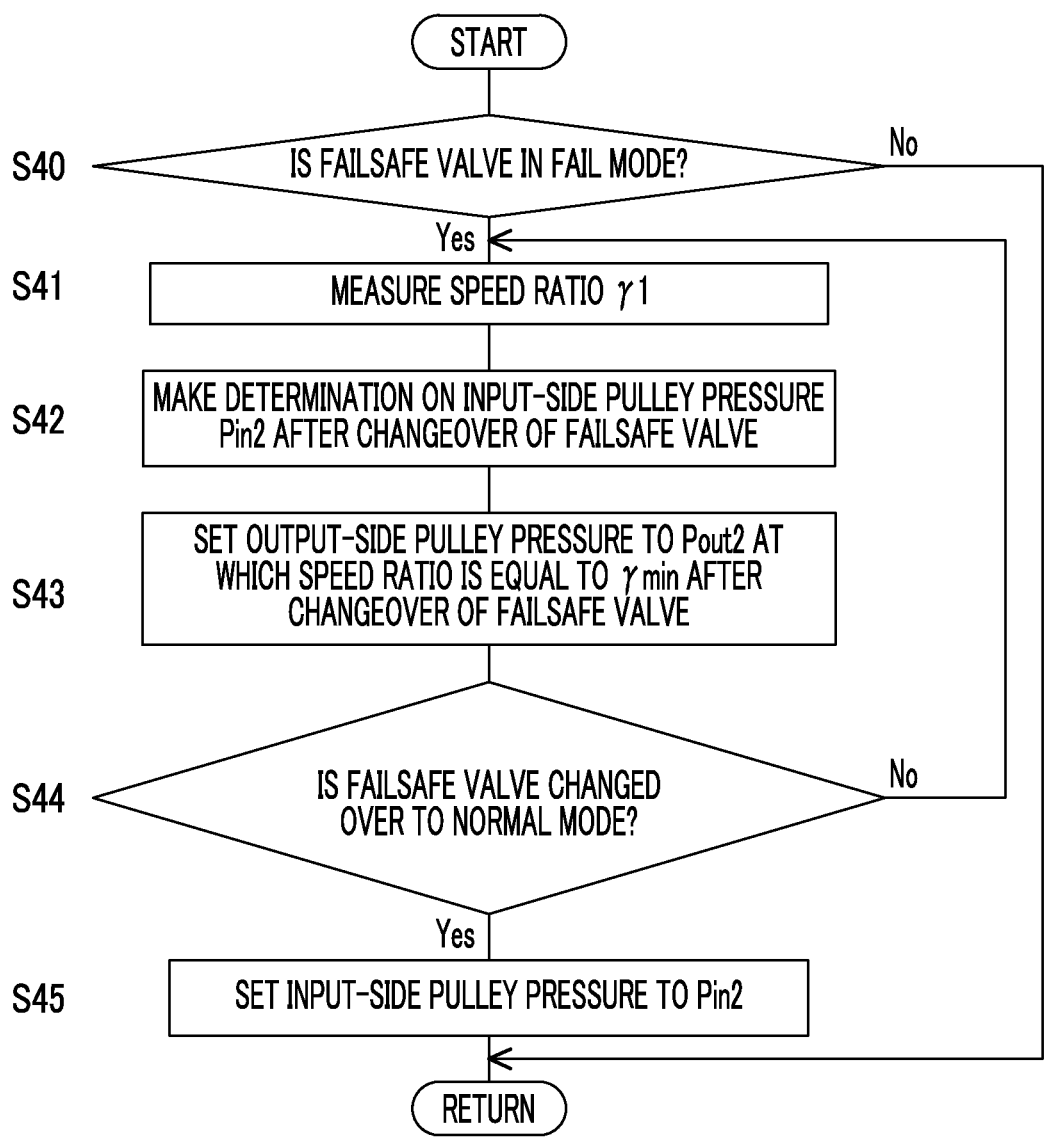
FIG. 16 is a flowchart illustrating an essential part of an operation of the electronic control unit in making a changeover from the fail mode to the non-fail mode in the electronic control unit of FIG. 14.

FIG. 16 is a flowchart showing an essential part of a control operation of restraining the speed ratio γ from changing when a changeover from the fail mode to the normal mode is made, and this flowchart is repeatedly executed. In S40 corresponding to the fail mode determination means 104, it is determined whether or not the failsafe valve Vf is in the fail mode. If the result of this determination is regarded as positive, a determination on the speed ratio γ1 at the time of the fail mode is made in S41 corresponding to the speed ratio determination means 106. Besides, in S42 corresponding to the oil pressure determination means 108, a determination on the input-side pulley pressure Pin2 as the input-side pulley pressure Pin after a return to the normal mode is made. Furthermore, in S43 corresponding to the speed ratio setting means 110, a determination on the output-side pulley pressure Pout2 at which the speed ratio γ is equal to the minimum speed ratio γmin both in the fail mode and in the normal mode is made, and the output-side pulley pressure Pout is set to the determined output-side pulley pressure Pout2. In the fail mode changeover means 114 corresponding to S44, if the result of a determination on a changeover of the failsafe valve Vf to the normal mode is regarded as negative, the control operation starting from S41 is repeated. If the result of this determination is regarded as positive, namely, if a determination on a changeover from the fail mode to the normal mode is made, the input-side pulley pressure Pin is set to Pin2 to make a changeover to the normal mode, in S45 corresponding to the oil pressure setting means 116.

In making a changeover to the fail mode through the output oil pressure Ps1 of the linear solenoid valve SL1 to the actuator that operates the input-side pulley 54, the command oil pressure Ps1 to the pressure adjusting valve 74 that supplies an oil pressure to the actuator of the input pulley 54 changes, so the speed ratio γ may rapidly change. In this case, according to the present embodiment of the present disclosure, as soon as the fail mode is entered, the output-side pulley pressure Pout is set to the pressure at which the speed ratio γ is equal to the minimum speed ratio γmin both in the fail mode and in the normal mode. Therefore, a shock is restrained from occurring due to changes in the speed ratio γ in making a changeover from the fail mode to the normal mode as well.

The present disclosure is also applicable to still another aspect thereof. An automatic transmission to which the present disclosure is applied as to still another one of the embodiments of the present disclosure is also the same as in the foregoing embodiments of the present disclosure, so only the difference therebetween will be described.

Figure 17:
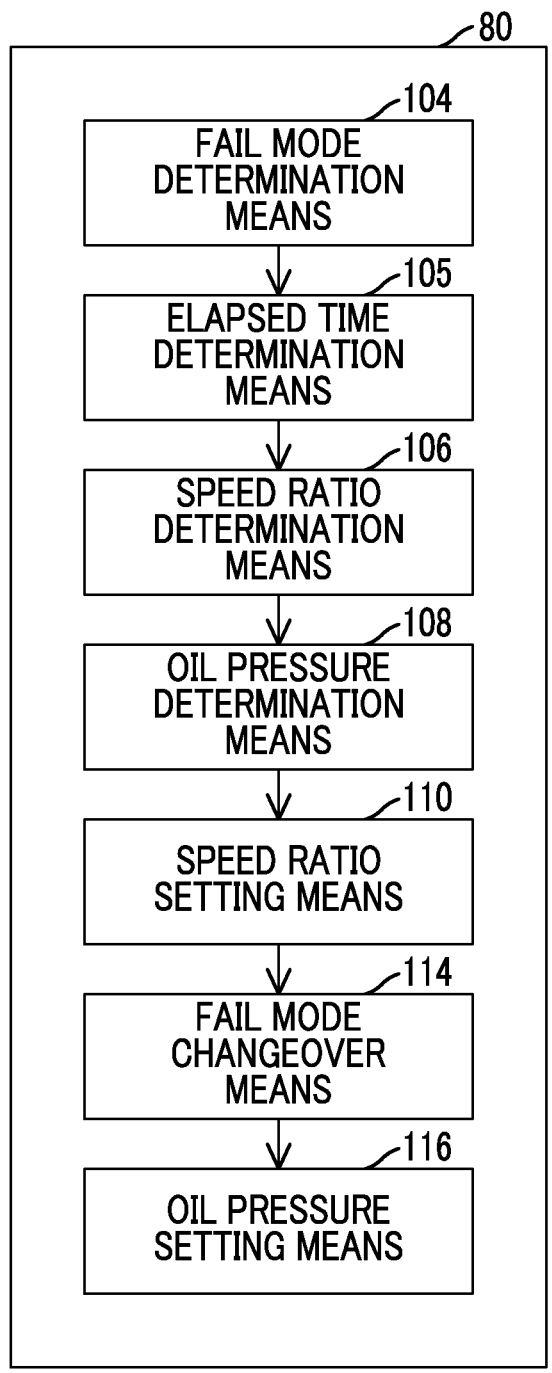
FIG. 17 is a view illustrating still another example of the essential part of control functions and a control system for various kinds of control in the vehicle of FIG. 1.
Figure 18:
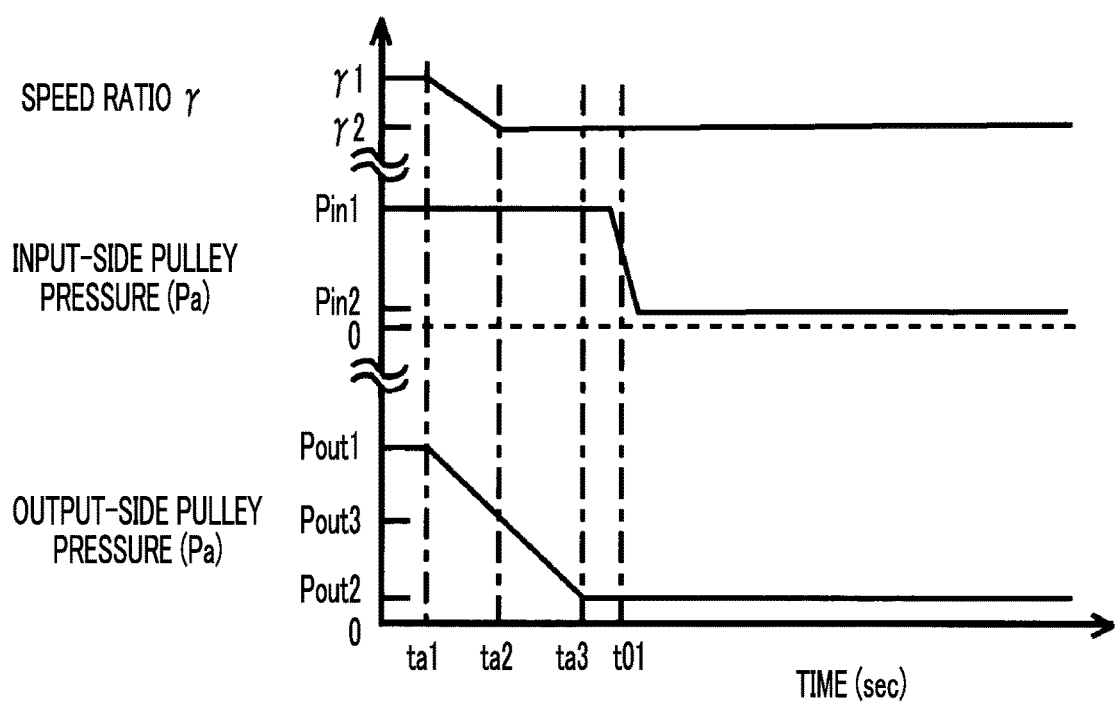
FIG. 18 is a view showing changes in speed ratio in the case where the output-side pulley pressure is made equal to a pressure at which the speed ratio is minimized, before making a changeover to a fail mode.

In FIG. 17, the control functions of the electronic control unit 80 are different from those of another one of the embodiments of the present disclosure only in elapsed time determination means 105. The elapsed time determination means 105 is added to another one of the embodiments of the present disclosure. In the present embodiment of the present disclosure, when the fail mode is entered from the normal mode, the elapsed time determination means 105 makes a determination on an elapsed time from the entrance into the fail mode. The control functions after the lapse of a predetermined elapsed time T (sec), namely, the means starting from the speed ratio determination means 106 are the same as in another one of the embodiments of the present disclosure. FIG. 18 shows a time chart in the case where the output-side pulley pressure Pout2 is adjusted after the lapse of the predetermined time T. When the elapsed time after the entrance into the fail mode reaches the predetermined elapsed time T at a time point ta1, a determination on the speed ratio γ1 in the fail mode is made. Besides, based on this determination, a determination on the output-side pulley pressure Pout2 at which the speed ratio γ is equal to the minimum speed ratio γmin both in the fail mode and in the normal mode is made, and the output-side pulley pressure Pout is lowered toward the determined output-side pulley pressure Pout2. At a time point ta2, the output-side pulley pressure Pout falls to Pout3, so the speed ratio γ is reduced from γ1 to γ2, that is, the minimum speed ratio γmin. The output-side pulley pressure Pout is lowered after that as well. At a time point ta3, the output-side pulley pressure Pout is lowered to Pout2 at which the speed ratio γ does not change even when the input-side pulley pressure falls to Pin2 in the normal mode, and then is held equal to the input-side pulley pressure. When a changeover from the fail mode to the normal mode, namely, a changeover of the failsafe valve Vf to the normal mode is made at the time point t01, the input-side pulley pressure Pin falls, but the speed ratio γ is restrained from changing.

Figure 19:
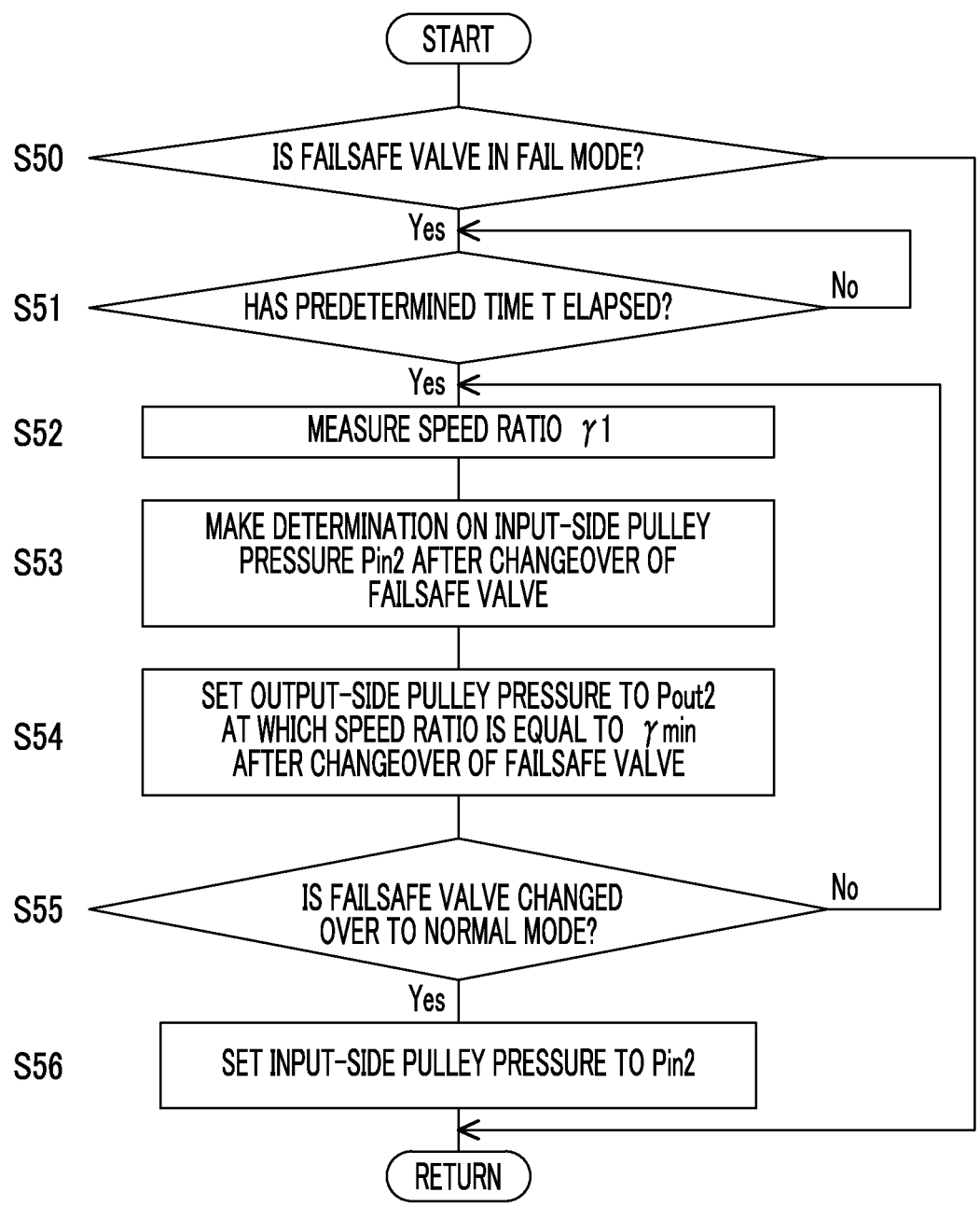
FIG. 19 is a flowchart illustrating an essential part of an operation of an electronic control unit of FIG. 17 in making a changeover from the fail mode to a non-fail mode in the electronic control.

FIG. 19 is a flowchart showing an essential part of a control operation of restraining the speed ratio γ from changing in the case where a changeover from the fail mode to the normal mode is made. The present embodiment of the present disclosure is different from the foregoing another one of the embodiments of the present disclosure only in S51 corresponding to the elapsed time determination means 105. If it is determined in S50 corresponding to the fail mode determination means 104 that the failsafe valve Vf is in the fail mode, it is determined in S51 corresponding to the elapsed time determination means 105 whether or not the predetermined time T has elapsed after a transition to the fail mode. If the result of this determination is regarded as positive, the same control operation as in S41 to S45 of another one of the embodiments of the present disclosure is performed.

According to the present embodiment of the present disclosure, a changeover from the fail mode to the normal mode can be made after performing some operation (not shown) within a predetermined time after a transition to the fail mode. Besides, a shock can also be restrained from occurring due to a change in the speed ratio γ.

The present disclosure is also applicable to still another aspect thereof. An automatic transmission to which the present disclosure is applied as to still another one of the embodiments of the present disclosure is the same as that of the foregoing embodiments of the present disclosure, and only the difference therebetween will be described.

Figure 20:
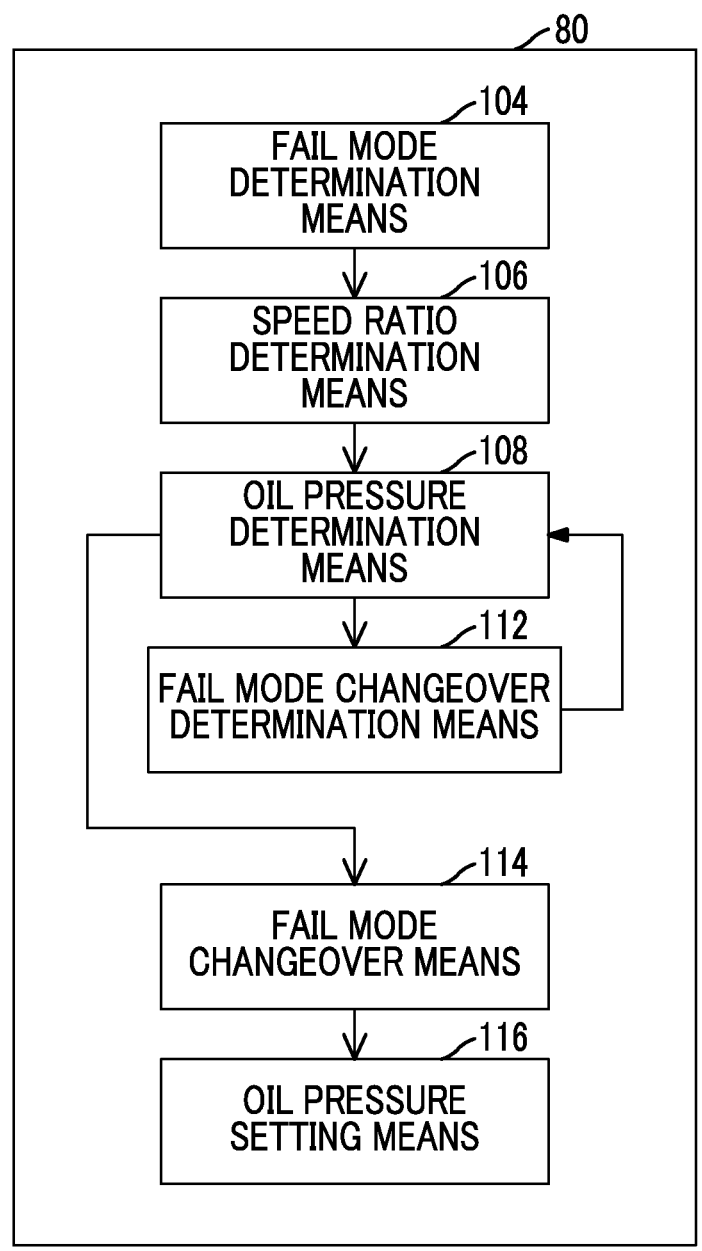
FIG. 20 is a view illustrating still another example of an essential part of control functions and a control system for various kinds of control in the vehicle of FIG. 1.

In FIG. 20, the control functions of the electronic control unit 80 in the case where, for example, an operational malfunction occurs in the linear solenoid valve SL3 for adjusting the pressure of the clutch C2 that feeds an oil pressure to the running clutch C2 and a return from the fail mode to the normal mode is made in the fail mode in which the linear solenoid valve SL1 is stopped from being energized and at least the linear solenoid valve SL2 continues to be energized will be described. In the electronic control unit 80, the fail mode determination means 104 determines whether the failsafe valve is in the fail mode or the normal mode. When the failsafe valve is in the fail mode, the speed ratio determination means 106 makes a determination on the speed ratio γ1 in the fail mode, and the oil pressure determination means 108 makes a determination on the input-side pulley pressure Pin2 to the input-side pulley 54 after a return to the normal mode. The fail mode changeover determination means 112 determines whether or not a changeover from the fail mode to the normal mode is made. When a changeover to the normal mode is made, the oil pressure determination means 108 lowers the output-side pulley pressure Pout, and determines whether or not the output-side pulley pressure Pout has reached the output-side pulley pressure Pout2 at which the speed ratio is equal to γmin. When the output pulley pressure Pout reaches Pout2, the fail mode changeover means 114 changes over the failsafe valve Vf, and the oil pressure setting means 116 sets the input-side pulley pressure to the input-side pulley pressure Pin2.

Figure 21:
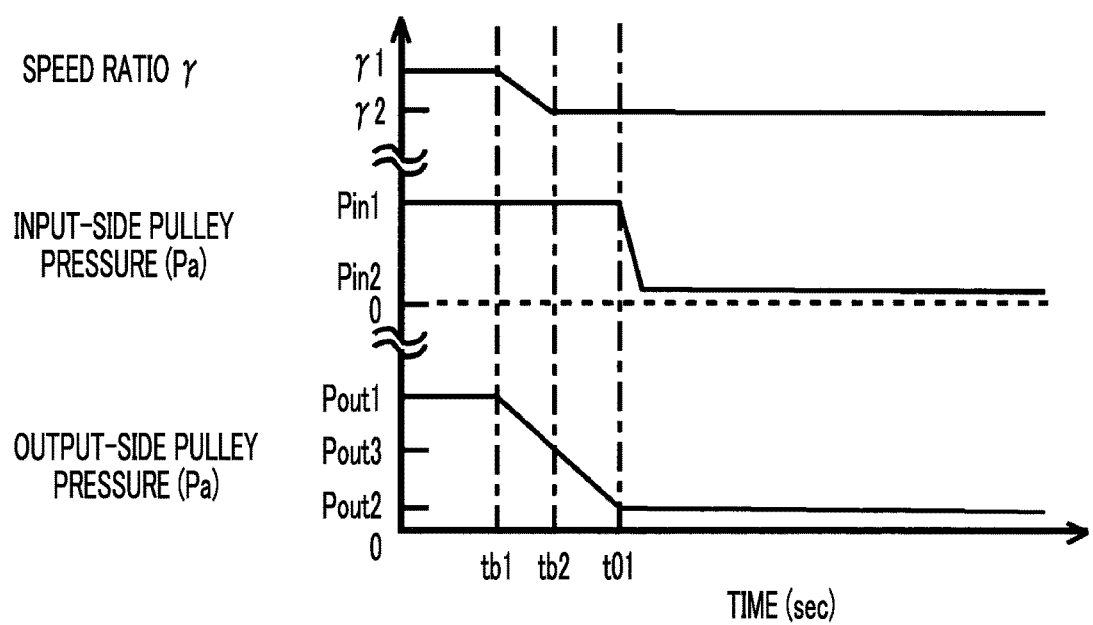
FIG. 21 is a view showing changes in speed ratio in the case where the output-side pulley pressure is made equal to a pressure at which the speed ratio is minimized, before making a changeover to a fail mode in FIG. 20.

FIG. 21 shows a time chart in the case where the output-side pulley pressure Pout2 is adjusted after a determination on a changeover from the fail mode to the normal mode. In the fail mode, a determination on the speed ratio γ1 in the fail mode and the input-side pulley pressure Pin2 in the normal mode is made. At a time point tb1, a determination on a changeover from the fail mode to the normal mode is made, and the output-side pulley pressure Pout is lowered from Pout1. At a time point tb2, the speed ratio γ1 reaches the minimum speed ratio γmin. The output-side pulley pressure Pout further falls. When the output-side pulley pressure Pout reaches the output-side pulley pressure Pout2 at which the speed ratio γ is held equal to γmin even when the input-side pulley pressure Pin falls to Pin2 at the time point t01, the failsafe valve Vf is changed over, and the input-side pulley pressure Pin falls to Pin2. However, the output-side pulley pressure Pout has already been set to the output-side pulley pressure Pout2 at which the speed ratio γ is minimized, and the speed ratio γ is restrained from changing.

Figure 22:
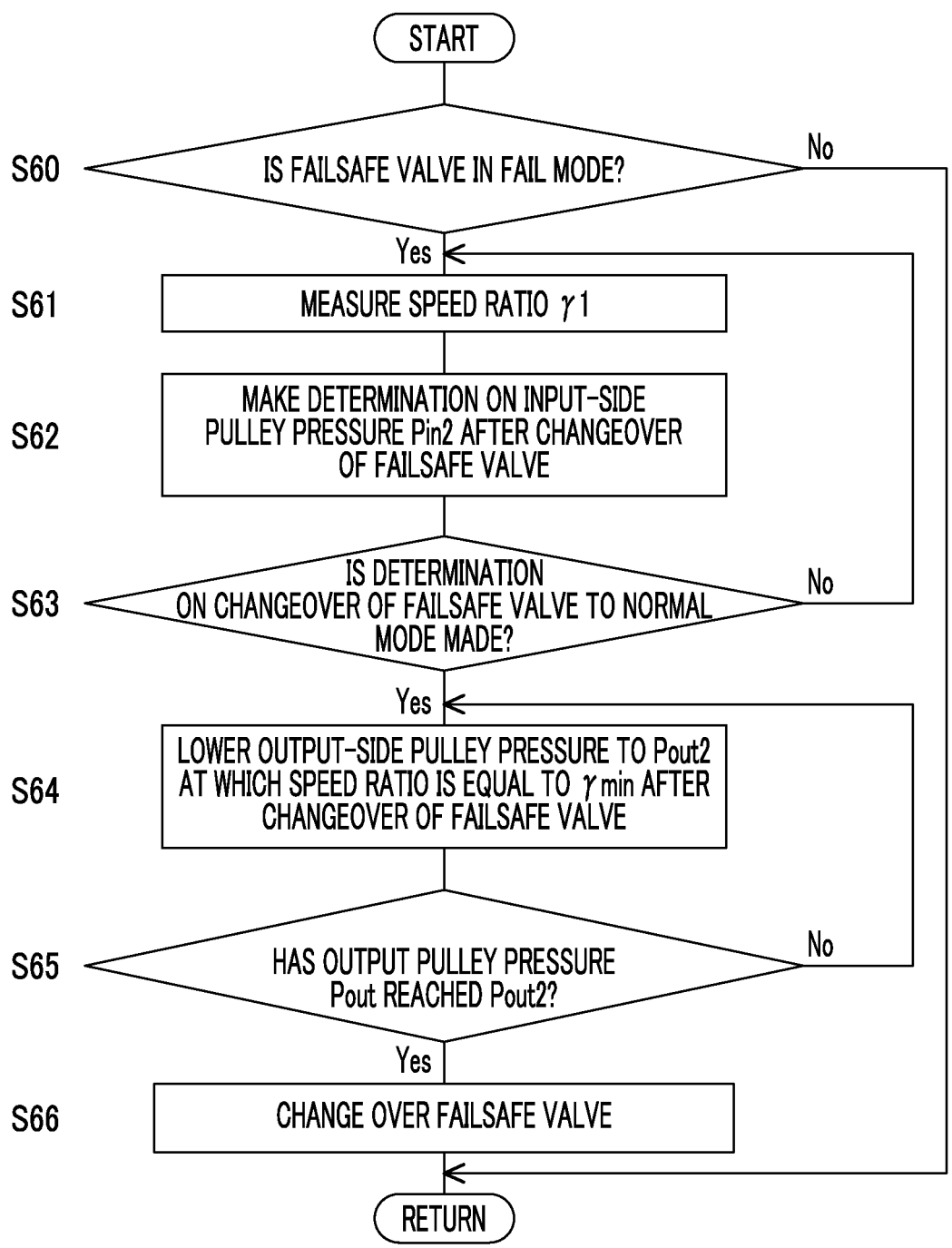
FIG. 22 is a flowchart illustrating an essential part of an operation of an electronic control unit of FIG. 20 in making a changeover from a fail mode to a non-fail mode in the electronic control unit.

FIG. 22 is a flowchart showing an essential part of a control operation of restraining the speed ratio γ from changing when a changeover from the fail mode to the normal mode is made, and this flowchart is repeatedly executed. In the present embodiment of the present disclosure, in S60 corresponding to the fail mode determination means 104, it is determined whether or not the failsafe valve is in the fail mode. If the result of this determination is regarded as positive, a determination on the speed ratio γ1 at the time of the fail mode is made in S61 corresponding to the speed ratio determination means 106. Besides, in S62 corresponding to the oil pressure determination means 108, a determination on the input-side pulley pressure Pin2 as the input-side pulley pressure Pin after a return to the normal mode is made. Furthermore, in S63 corresponding to the fail mode changeover determination means 112, a determination on a changeover of the failsafe valve Vf to the normal mode is made. If the result of this determination is regarded as positive, the oil pressure of the input-side pulley is lowered toward the output-side pulley pressure Pout2 at which the speed ratio is equal to γmin after a changeover of the failsafe valve Vf, in S64 corresponding to the oil pressure determination means 108. If it is determined in S65 corresponding to the oil pressure determination means 108 that the output-side pulley pressure Pout has reached Pout2, the failsafe valve Vf is changed over from the fail mode to the normal mode in S66 corresponding to the fail mode changeover means 114.

According to the present embodiment of the present disclosure, a changeover from the fail mode to the normal mode can be made after making a determination on the changeover from the fail mode to the normal mode. Thus, a shock is effectively restrained from occurring due to a change in the speed ratio γ.

Although the embodiments of the present disclosure have been described above in detail based on the drawings, one of the embodiments of the present disclosure can also be carried out in combination with other of the embodiments of the present disclosure.

What is claimed is:

1. A control apparatus for a vehicular continuously variable transmission, the vehicular continuously variable transmission including a pair of pulleys, the control apparatus comprising:
    a pair of actuators, each of the actuators being configured to adjust effective diameters of the pair of the pulleys respectively;
    a pair of pulley pressure adjusting valves, each of the pulley pressure adjusting valves being configured to supply control oil pressures to the pair of actuators respectively;
    a pair of electromagnetic valves, each of the electromagnetic valves being configured to output command oil pressures to the pair of the pulley pressure adjusting valves respectively;
    a source pressure adjusting valve configured to adjust a source pressure, the source pressure being an oil pressure supplied to the pair of the electromagnetic valves; and
    an electronic control unit configured to:
        (i) control the source pressure adjusting valve to lower the source pressure at a time of a fail mode below the source pressure at a time of a non-fail mode, at the time of the fail mode; and
        (ii) control command signals to the pair of the electromagnetic valves such that the command signals decrease below command signals at the time of the non-fail mode, before cancelling lowering of the source pressure in making a changeover from the fail mode to the non-fail mode.

2. The control apparatus according to claim 1, wherein the electronic control unit is configured to control the command signals to make the command signals correspond to an oil pressure equal to or lower than an oil pressure that is supplied to the source pressure adjusting valve at the time of the fail mode for a predetermined time set in advance, in making a changeover from the fail mode to the non-fail mode.

3. The control apparatus according to claim 1, wherein the electronic control unit is configured to control the command signals to make the command signals correspond to an oil pressure equal to or lower than the source pressure at the time of the fail mode for a predetermined time set in advance, in making a changeover from the fail mode to the non-fail mode.

4. A control apparatus for a vehicular continuously variable transmission, the vehicular continuously variable transmission including an input-side pulley and an output-side pulley, the control apparatus comprising:
   an input side actuator configured to adjust effective diameters of the input-side pulley;
   an input-side pulley pressure adjusting valve configured to supply a control oil pressure to the input-side actuator;
   an output-side actuator configured to adjust effective diameters of the output-side pulley;
   an output-side pulley pressure adjusting valve configured to supply a control oil pressure to the output-side actuator;
   a pair of electromagnetic valves, each of the electromagnetic valves are configured to output command oil pressures to the input-side pulley pressure adjusting valve and the output-side pulley pressure adjusting valve respectively; and
   an electronic control unit configured to:
   (i) make a changeover from a fail mode to a non-fail mode based on the command oil pressure to the input-side pulley pressure adjusting valve, and
   (ii) control the command oil pressure to the output-side pulley pressure adjusting valve to reduce a change in a speed ratio of the continuously variable transmission resulting from a changeover from the fail mode to the non-fail mode, before making the changeover from the fail mode to the non-fail mode.

5. The control apparatus according to claim 4, wherein the electronic control unit is configured to set the command pressure to the output-side pulley pressure adjusting valve to a value that reduces the speed ratio of the continuously variable transmission, during the fail mode.

6. The control apparatus according to claim 4, wherein the electronic control unit is configured to set the command pressure to the output-side pulley pressure adjusting valve to a value that reduces the speed ratio of the continuously variable transmission, before making the changeover from the fail mode to the non-fail mode.

7. The control apparatus according to claim 4, wherein the electronic control unit is configured to start a changeover for setting the command oil pressure to the output-side pulley pressure adjusting valve to a value at which the speed ratio of the continuously variable transmission is reduced after making a determination on the changeover from the fail mode to the non-fail mode, and complete the changeover for setting the command oil pressure to the output-side pulley pressure adjusting valve to the value at which the speed ratio of the continuously variable transmission is reduced before making the changeover to the non-fail mode.

* * * * *